(12) United States Patent
Ablitt

(10) Patent No.: US 10,885,020 B1
(45) Date of Patent: Jan. 5, 2021

(54) SPLITTING INCORRECTLY RESOLVED ENTITIES USING MINIMUM CUT

(71) Applicant: SAS Institute Inc., Cary, NC (US)

(72) Inventor: Nicholas Akbar Ablitt, Putney (GB)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/935,429

(22) Filed: Jul. 22, 2020

Related U.S. Application Data

(60) Provisional application No. 62/956,820, filed on Jan. 3, 2020, provisional application No. 62/981,621, filed on Feb. 26, 2020, provisional application No. 62/991,929, filed on Mar. 19, 2020.

(51) Int. Cl.
*G06F 17/00* (2019.01)
*G06F 16/23* (2019.01)
*G06F 16/28* (2019.01)
*G06F 16/26* (2019.01)

(52) U.S. Cl.
CPC ......... *G06F 16/2365* (2019.01); *G06F 16/26* (2019.01); *G06F 16/288* (2019.01)

(58) Field of Classification Search
CPC ..... G06F 16/2365; G06F 16/26; G06F 16/288
See application file for complete search history.

(56) References Cited

U.S. PATENT DOCUMENTS

| | | | | |
|---|---|---|---|---|
| 8,639,695 B1 * | 1/2014 | Spielthenner | ......... | G06F 16/285 707/737 |
| 8,965,848 B2 * | 2/2015 | Caceres | ................ | G06F 16/215 707/626 |
| 9,015,171 B2 | 4/2015 | Bayliss | | |
| 9,400,835 B2 * | 7/2016 | Setlur | .................... | G06F 16/248 |
| 2014/0012724 A1 | 1/2014 | O'leary et al. | | |
| 2014/0052685 A1 * | 2/2014 | Adair | ........................ | G06N 5/02 706/48 |
| 2016/0110424 A1 * | 4/2016 | Goeppinger | ............ | G06F 16/35 707/780 |
| 2018/0137150 A1 | 5/2018 | Osesina et al. | | |

(Continued)

OTHER PUBLICATIONS

Conroy, Julie, "Entity Resolution and Linking: Enabling Next-Generation Financial Crime Detection", Aite Group (Apr. 2019).

(Continued)

*Primary Examiner* — Greta L Robinson
(74) *Attorney, Agent, or Firm* — Coats & Bennett PLLC

(57) ABSTRACT

A computing device obtains an indication of data records resolved to describe a single entity in an entity resolution. The data records comprise peripheral records resolved to describe the single entity based on matching data of a central record of the data records. The device generates an indication indicating that at least one of the first peripheral record and the second peripheral record does not describe the single entity by setting a first one of the data records as a source; and setting a second one of the data records as a sink. The device generates a data structure identifying record linkage information for records of the dataset. The record linkage information indicates one or more pathways between the source and the sink along the linked records. The device executes a minimum cut algorithm to identify one or more connections of the one or more pathways to unlink.

30 Claims, 28 Drawing Sheets

(56) References Cited

U.S. PATENT DOCUMENTS

2018/0144003 A1* 5/2018 Formoso ............... G06F 16/244
2019/0303371 A1* 10/2019 Rowe ................ G06F 16/24564

OTHER PUBLICATIONS

Tauer, Gregory, et al., "An incremental graph-partitioning algorithm for entity resolution", Information Fusion, vol. 46, pp. 171-183 (2019).

Getoor, Lise, et al., "Entity Resolution: Tutorial", http://www.cs.umd.edu/~getoor/Tutorials/ER_VLDB2012.pdf.

Perez, Francis, "Accommodations Deduplication", Master Degree Thesis, University of the Basque Country (Sep. 24, 2018).

Chen, Zheng, et al., "Graph-based Event Coreference Resolution", Proceedings of the 2009 Workshop on Graph-based Methods for Natural Language Processing, ACL-IJCNLP, Suntec, Singapore, pp. 54-57 (Aug. 7, 2009).

Shu, Liangcai, et al., "A Latent Topic Model for Complete Entity Resolution", Dept. of Computer Science, SUNY at Binghampton (no date shown).

On, Byung-Won, et al., "An Effective Approach to Entity Resolution Problem Using Quasi-Clique and its Application to Digital Libraries", JCDL '06, Chapel Hill, North Carolina (Jun. 11-15, 2006).

Papadakis, George, et al.., "Web-scale, Schema-Agnostic, End-to-End Entity Resolution", WWW 2018 (Apr. 2018).

Galhotra, Sainyam, et al., "Robust Entity Resolution using Random Graphs", SIGMOD '18, Houston, Texas (Jun. 10-15, 2018).

Nicolae, Cristina, et al., "BestCut: A Graph Algorithm for Coreference Resolution", Proceedings of the 2006 Conference on Empirical Methods in Natural Language Processing (EMNLP 2006), Sydney, pp. 275-283 (Jul. 2006).

Sindwani, Karan, "Unsupervised Entity Resolution using Graphs", https://towardsdatascience.com/unsupervised-entity-resolution-using-graphs-e12f5abae0ae, 7 pages (Feb. 12, 2020).

* cited by examiner

Record Information 1500

| Record 1510 | Name 1512A | Birth Date 1512B | Address 1512C | Phone 1512D | SSN 1512E |
|---|---|---|---|---|---|
| 1531 | M Johnson | July 17, 1978 | 23 Lorne St. | | |
| 1532 | M Johnson | July 17, 1978 | 23 Lorne St. | | 854-94-2004 |
| 1533 | S Clare | Oct. 7, 1976 | 6 Plaid Ave. | 482-9582 | 854-94-2004 |
| 1534 | S Clare | Oct. 7, 1976 | 6 Plaid Ave. | 482-9582 | |
| 1535 | S Clare | | | | 854-94-2004 |

| Record 1510 | Name 1512A | Birth Date 1512B | Address 1512C | Phone 1512D | SSN 1512E |
|---|---|---|---|---|---|
| 1531 | M Johnson | July 17, 1978 | 23 Lorne St. | 683-2940 | |
| 1532 | M Johnson | July 17, 1978 | 23 Lorne St. | 683-2940 | 854-94-2004 |
| 1533 | S Clare | Oct. 7, 1976 | 6 Plaid Ave. | 482-9582 | 854-94-2004 |
| 1534 | S Clare | Oct. 7, 1976 | 6 Plaid Ave. | | |
| 1535 | S Clare | | | 482-9582 | 854-94-2004 |

1700

1710 — Updated Information

FIG. 17A

| Record | Match values | Match type | Match weight |
|---|---|---|---|
| 1531 | M Johnson#17th July 1978 | A | 1 |
| 1531 | M Johnson#23 Lorne St | B | 2 |
| 1531 | M Johnson#6839 2940 | C | 3 |
| 1532 | M Johnson#17th July 1978 | A | 1 |
| 1532 | M Johnson#23 Lorne St | B | 2 |
| 1532 | M Johnson#6839 2940 | C | 3 |
| 1532 | 854-94-2004 | D | 4 |
| 1533 | S Clare#7th October 1976 | A | 1 |
| 1533 | S Clare#6 Plaid Av | B | 2 |
| 1533 | S Clare#4823 9582 | C | 3 |
| 1533 | 854-94-2004 | D | 4 |
| 1534 | S Clare#7th October 1976 | A | 1 |
| 1534 | S Clare#6 Plaid Av | B | 2 |
| 1535 | S Clare#4823 9582 | C | 3 |
| 1535 | 854-94-2004 | D | 4 |

*FIG. 17C*

User Split Entity

| Grp A 2110A | Grp B 2110B | Source Sys 2112 | Source Doc/Record 2114 | Role 2116 | Name 2118 | ID 2120 |
|---|---|---|---|---|---|---|
| ☑ | | Claim | 1001/101101 | Claimant | Michael Johnson | ABC12 |
| | | Policy | 303/756102 | Policyholder | Mick Johnson | ABC12 |
| | | Claim | 1002/45601 | Claimant | Michael Johnson | |
| | ☑ | Claim | 1002/45602 | Policyholder | Michael Johnson | DEF45 |

Add entity ▷

| Address | Postcode | Address Type |
|---|---|---|
| 23 Grand Street, Brixton, London | S4 3TH | Home |

| Telephone Number | Telephone Type |
|---|---|
| 0207 567969 | Office |

| Birth Date |
|---|
| July 17, 1978 |

▽ Justification

Mismatch in ID
Mismatch in Photo
Other

Comments 2100, 2130, 2150, 2140, 2160

*FIG. 21A*

SPLITTING INCORRECTLY RESOLVED ENTITIES USING MINIMUM CUT

CROSS-REFERENCE TO RELATED APPLICATIONS

The present application claims the benefit of and priority based on 35 U.S.C. § 119(e) to U.S. Provisional Application No. 62/956,820, filed Jan. 3, 2020, U.S. Provisional Application No. 62/981,621, filed Feb. 26, 2020, and U.S. Provisional Application No. 62/991,929, filed Mar. 19, 2020, the disclosures of which are incorporated herein by reference in their entirety.

BACKGROUND

Entity resolution is a computing technique used to identify data points or records that reference common entities. Entity resolution can be used to link records describing a same person, address, vehicle, or organization. Entity resolution is useful in analysis of data for a number of different purposes including customer intelligence, fraud, compliance and criminal investigations. For example, entity resolution can be used by a computing system to link criminal complaints as committed by a same person even when the person uses different aliases at arrest if they use other similar information such as a phone number or birthdate. However, entity resolution can also result in over-matching where records are linked together that do not describe the same entity even though the employed entity resolution technique indicates that all the records are candidates for describing the same entity.

SUMMARY

In an example embodiment, a computer-program product tangibly embodied in a non-transitory machine-readable storage medium is provided. The computer-program product includes instructions to cause a computing device to output an indication that peripheral records resolved to describe a single entity does not describe the single entity. The computer-program product includes instructions to cause a computing device to obtain a dataset indication of a dataset with data records each resolved to describe a single entity in an entity resolution. The data records comprise multiple peripheral records resolved to describe the single entity in the entity resolution based on matching data of a central record of the data records. The central record comprises first data matching data of a first peripheral record of the multiple peripheral records. The central record comprises second data matching data of a second peripheral record of the multiple peripheral records. The computer-program product includes instructions to cause a computing device to determine that at least two data records of the dataset do not describe a same entity. The computer-program product includes instructions to cause a computing device to generate a record indication indicating that at least one of the first peripheral record and the second peripheral record does not describe the single entity by setting a first one of the data records as a source; and setting a second one of the data records as a sink. The computer-program product includes instructions to cause a computing device to generate a record indication indicating that at least one of the first peripheral record and the second peripheral record does not describe the single entity by generating a data structure identifying record linkage information for records of the dataset. The record linkage information indicates linked records that have matching data, and one or more pathways between the source and the sink along the linked records. The computer-program product includes instructions to cause a computing device to generate a record indication indicating that at least one of the first peripheral record and the second peripheral record does not describe the single entity by identifying a first set of linked records that when unlinked would disconnect all of the one or more pathways between the source and the sink; and identifying a second set of linked records that when unlinked would disconnect all of the one or more pathways between the source and the sink. The first set of linked records is different than the second set of linked records. The computer-program product includes instructions to cause a computing device to generate a record indication indicating that at least one of the first peripheral record and the second peripheral record does not describe the single entity by generating a respective metric for each of respective linked records of the first set of linked records and the second set of linked records. The computer-program product includes instructions to cause a computing device to generate a record indication indicating that at least one of the first peripheral record and the second peripheral record does not describe the single entity by computing a first sum of one or more metrics corresponding to linked records of the first set; computing a second sum of one or more metrics corresponding to linked records of the second set; and identifying one or more connections of the pathway to unlink based on the first sum and the second sum. The computer-program product includes instructions to cause a computing device to output the record indication that at least one of the first peripheral record and the second peripheral record does not describe the single entity.

In another example embodiment, a computing device is provided. The computing device includes, but is not limited to, a processor and memory. The memory contains instructions that when executed by the processor control the computing device to output an indication that peripheral records resolved to describe a single entity do not describe the single entity.

In another example embodiment, a method of outputting an indication that peripheral records resolved to describe a single entity does not describe the single entity is provided.

Other features and aspects of example embodiments are presented below in the Detailed Description when read in connection with the drawings presented with this application.

BRIEF DESCRIPTION OF THE DRAWINGS

FIG. 15A illustrates an example of record information according to at least one embodiment of the present technology.

FIG. 17A illustrates an example of updating record information according to at least one embodiment of the present technology.

FIG. 17C illustrates an example data structure of record linkage information according to at least one embodiment of the present technology.

FIGS. 21A-21B illustrate an example of a graphical user interface for splitting entities according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
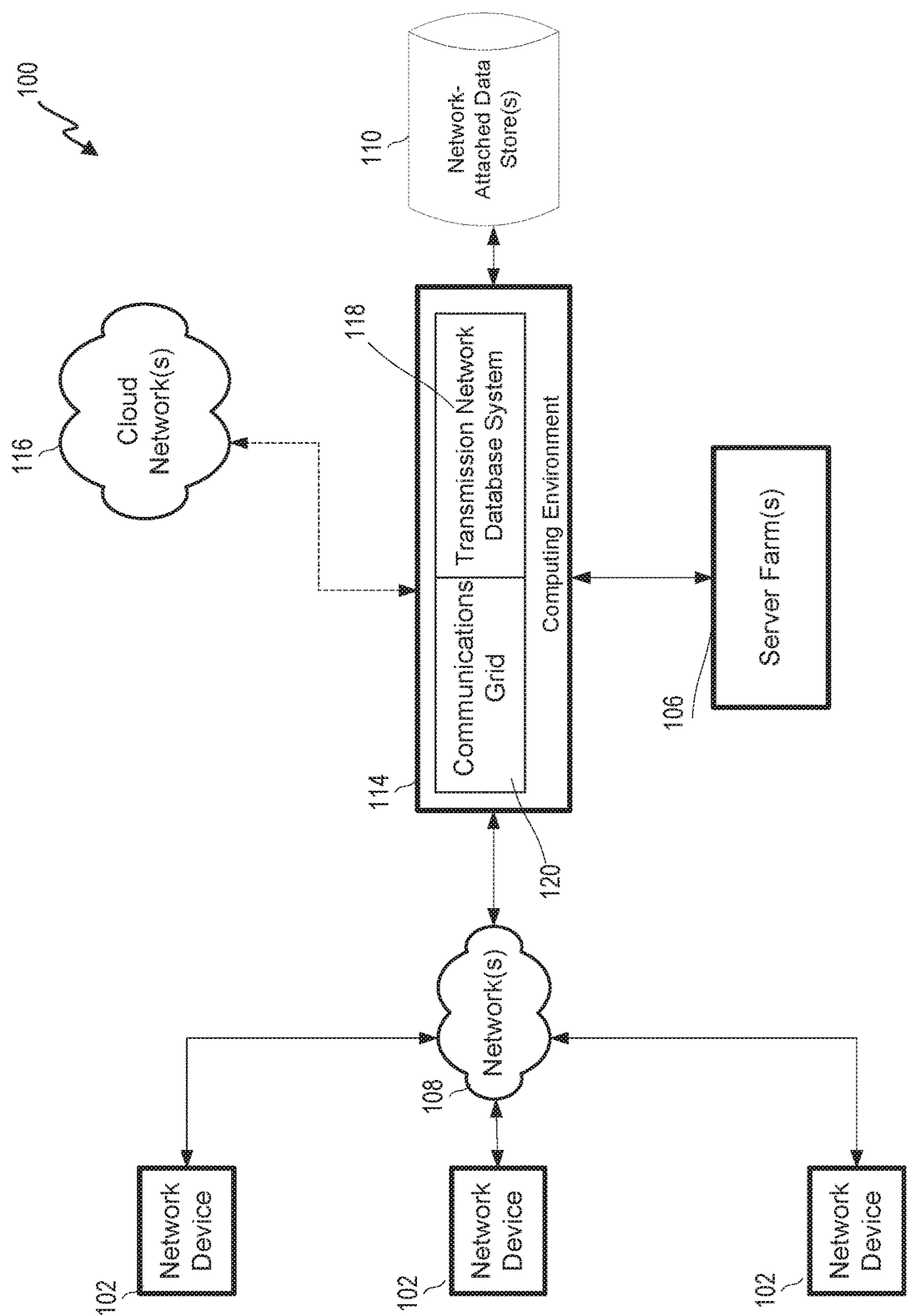
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
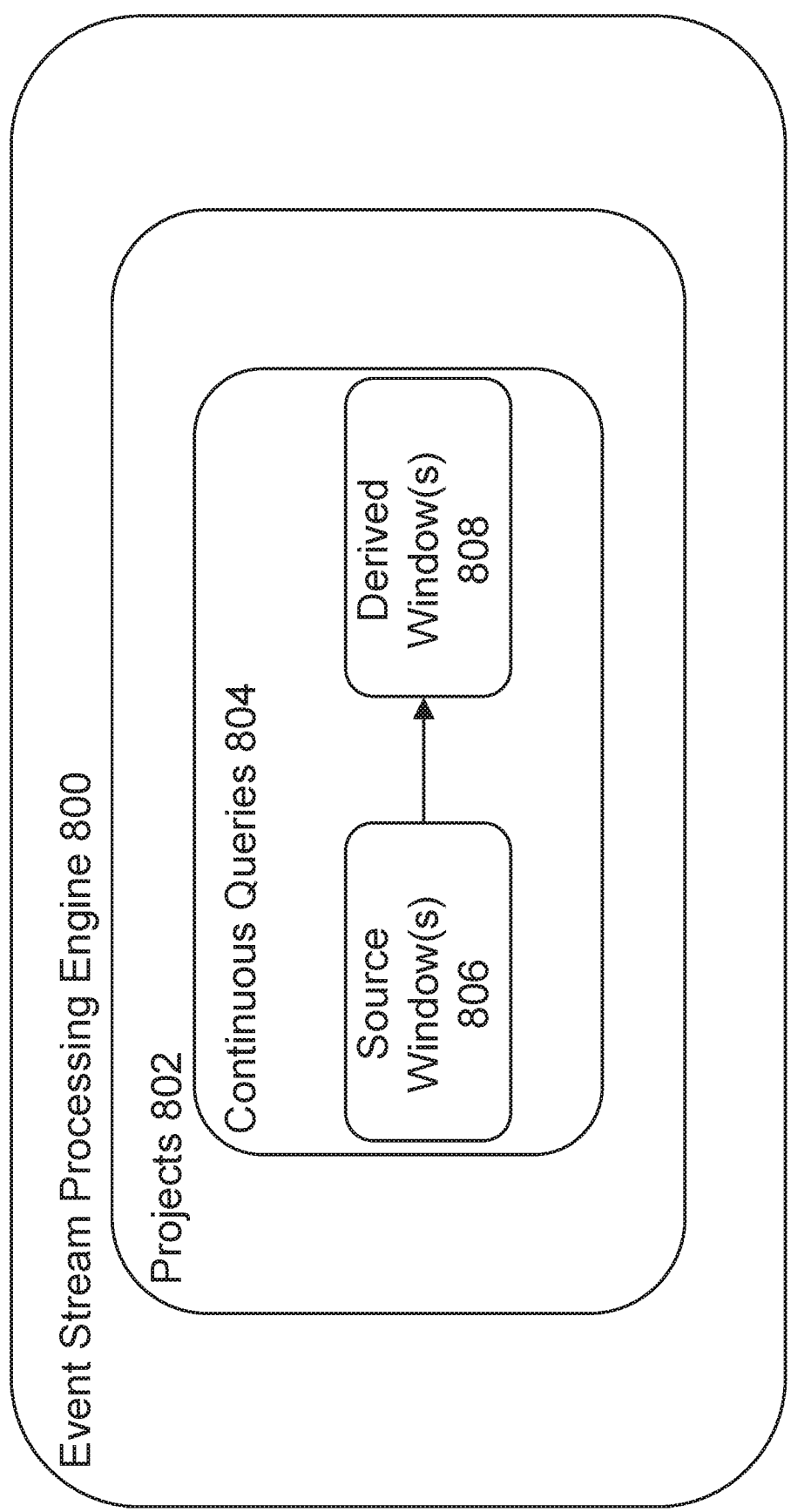
FIG. 8 illustrates a block diagram including components of an Event Stream Processing Engine (ESPE), according to at least one embodiment of the present technology.
Figure 9:
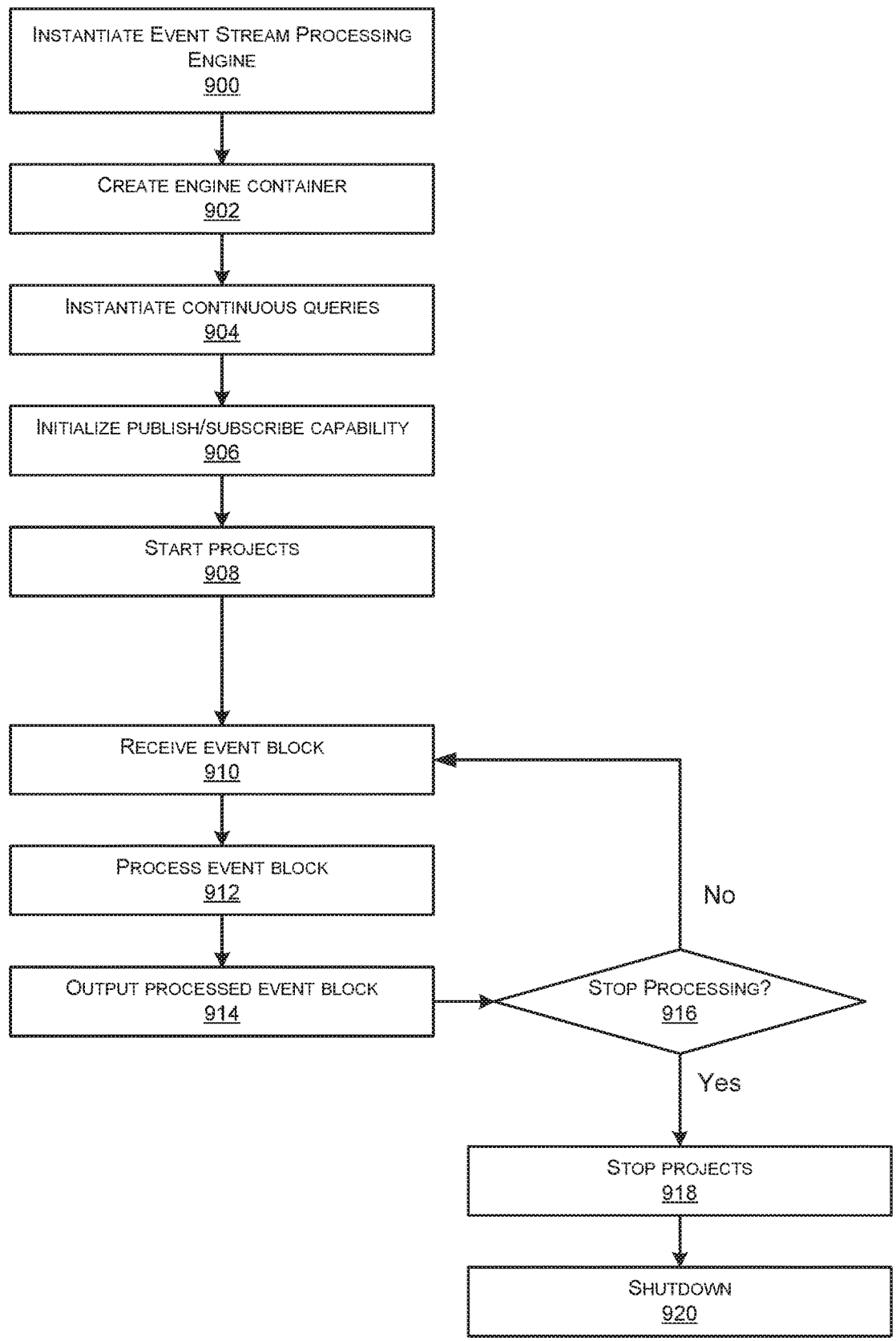
FIG. 9 illustrates a flow chart showing an example process including operations performed by an event stream processing engine, according to at least one embodiment of the present technology.
Figure 10:
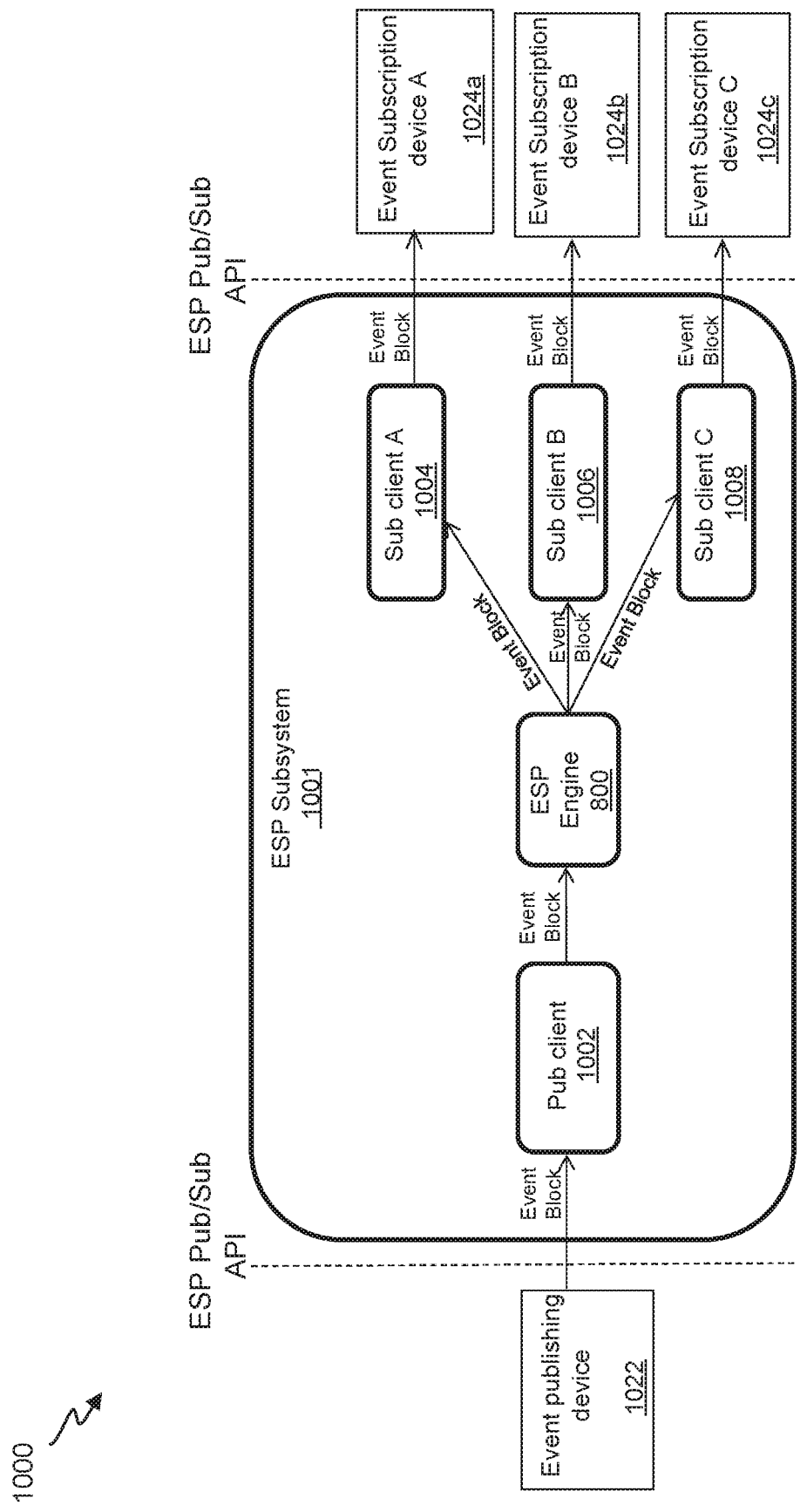
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
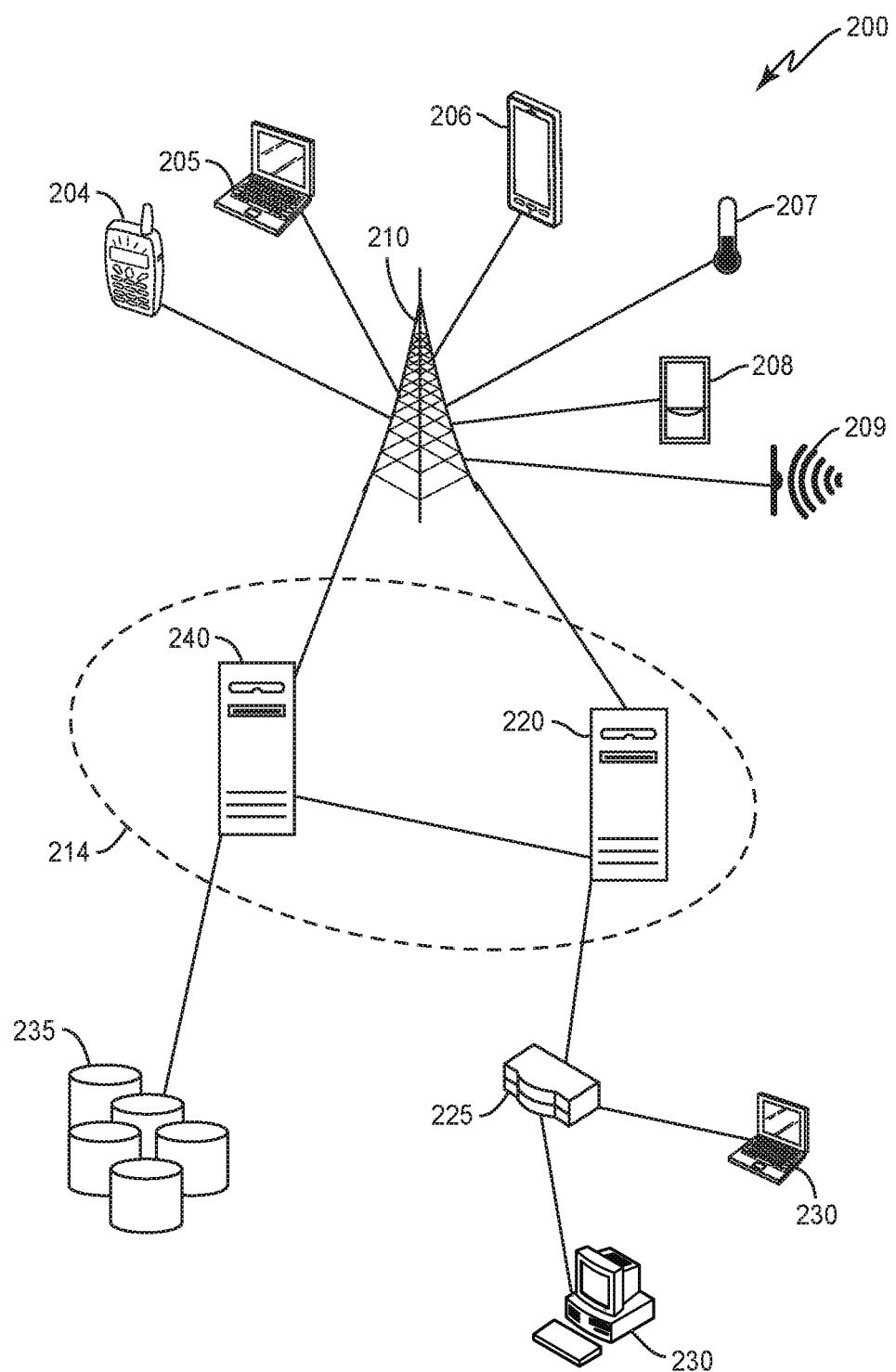
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
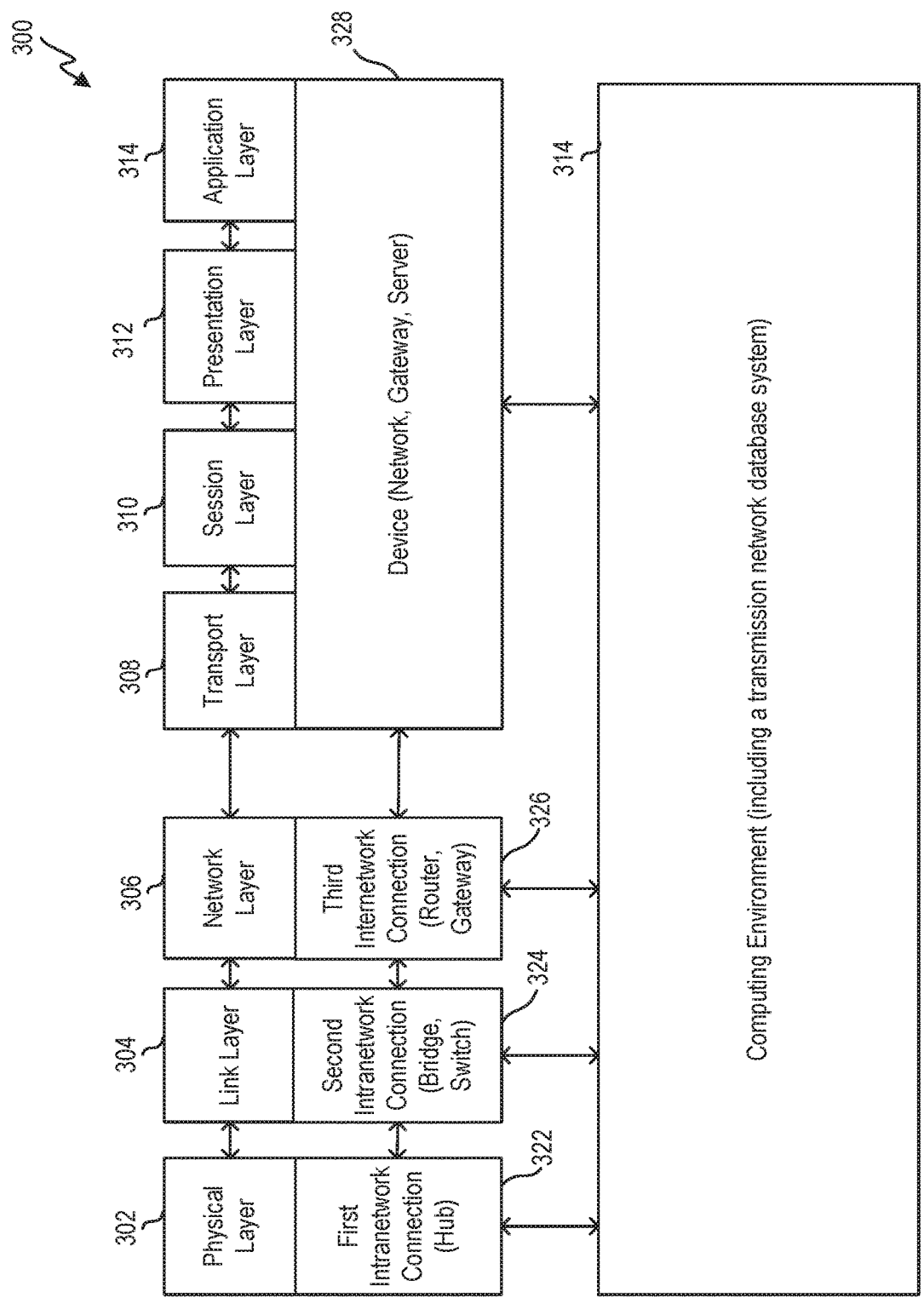
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
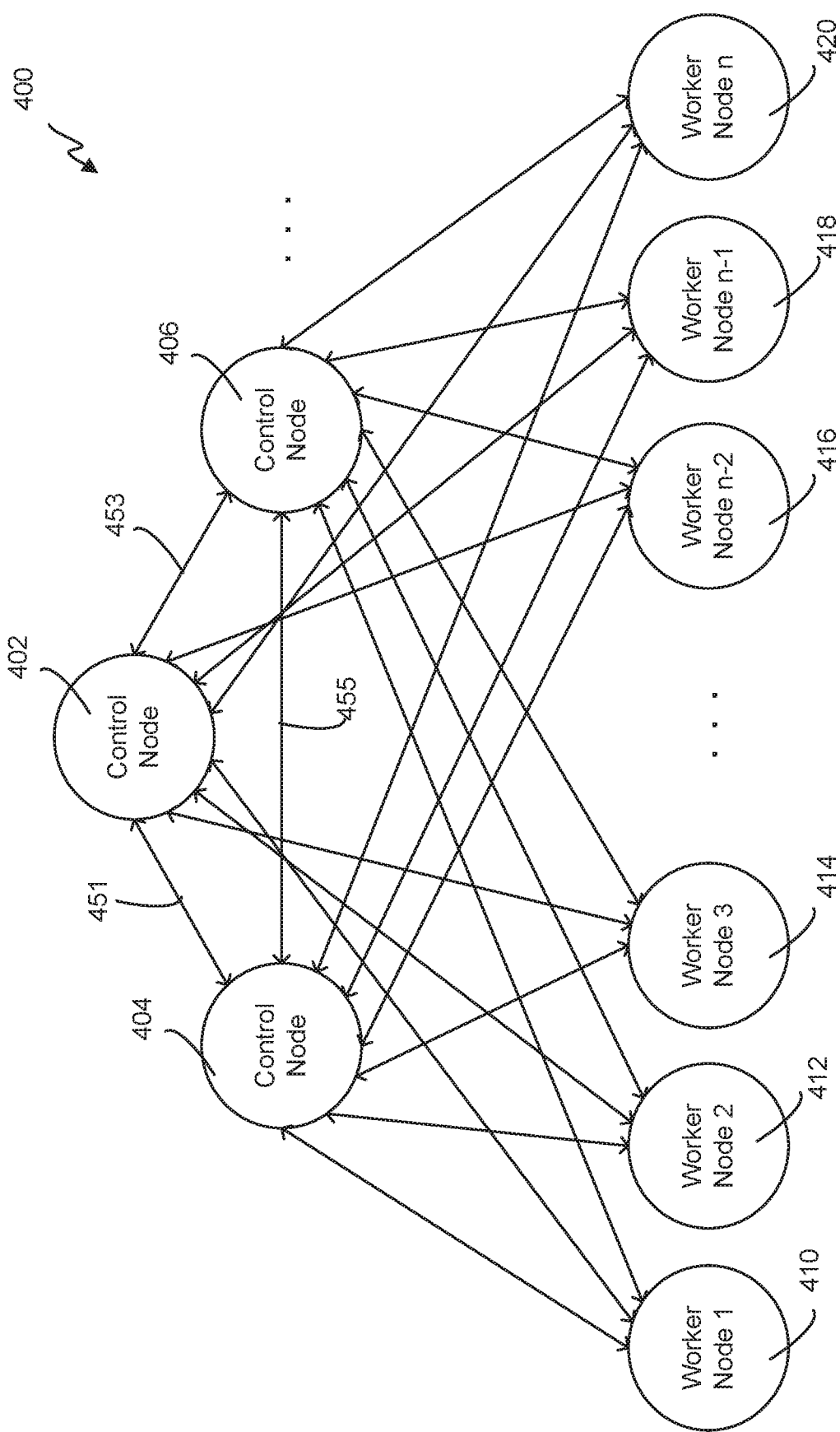
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420.

Although FIG. 4 shows six worker nodes, a communications grid according to embodiments of the present technology may include more or less than six worker nodes. The number of worker nodes included in a communications grid may be dependent upon how large the project or dataset is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a dataset. The dataset may be of any size. Once the control node receives such a project including a large dataset, the control node may distribute the dataset or projects related to the dataset to be performed by worker nodes. Alternatively, for a project including a large dataset, the dataset may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit authentication information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
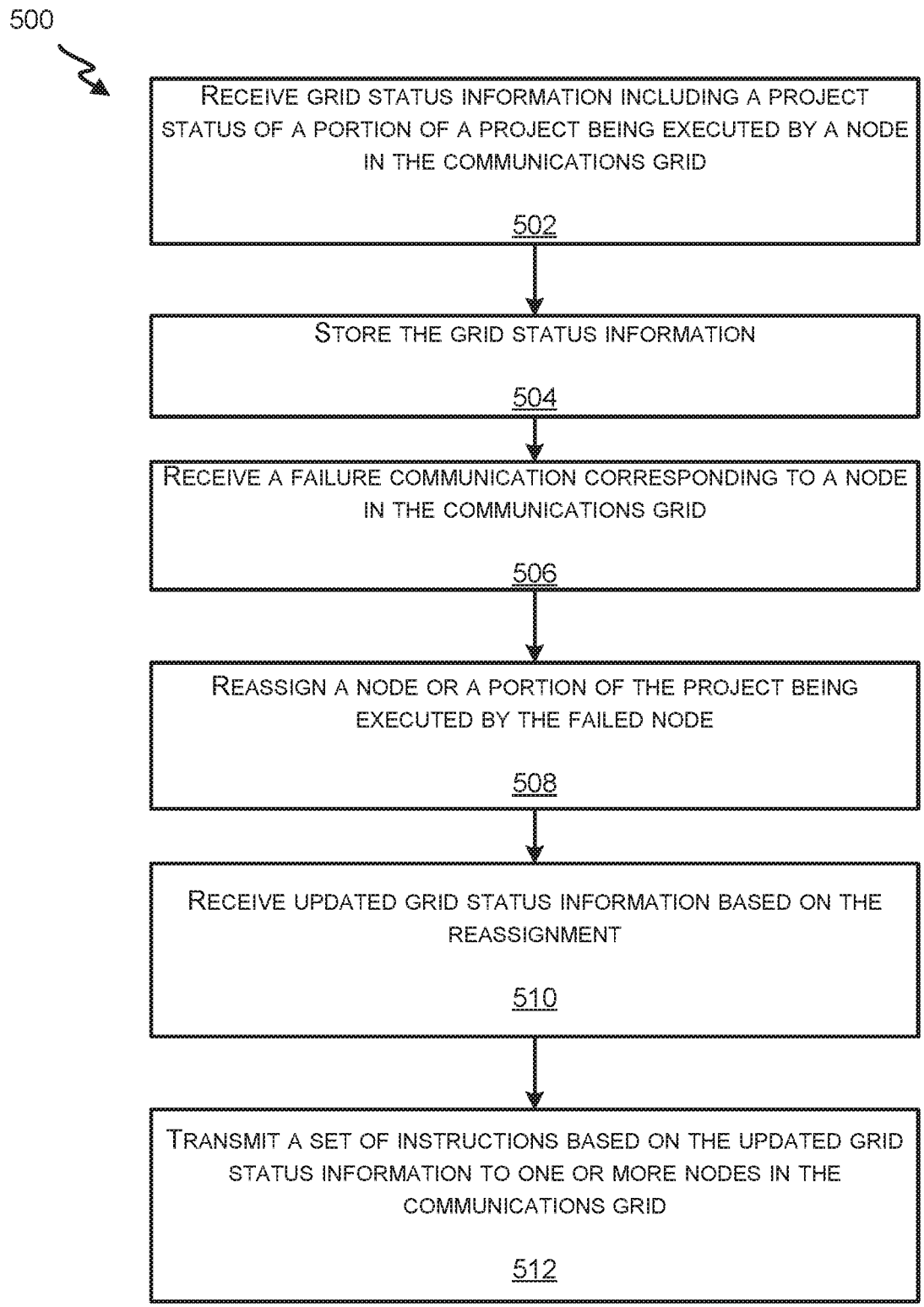
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
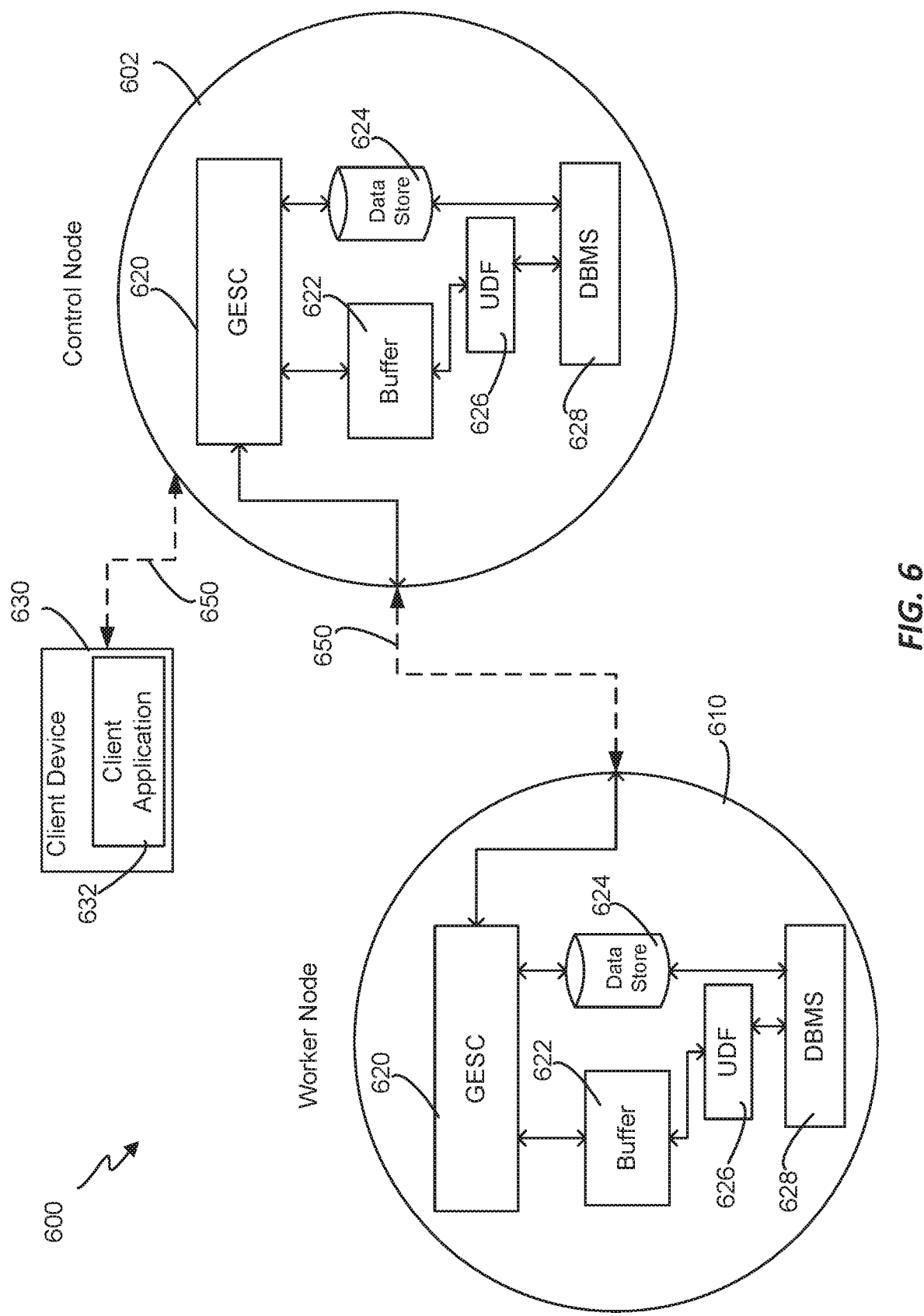
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
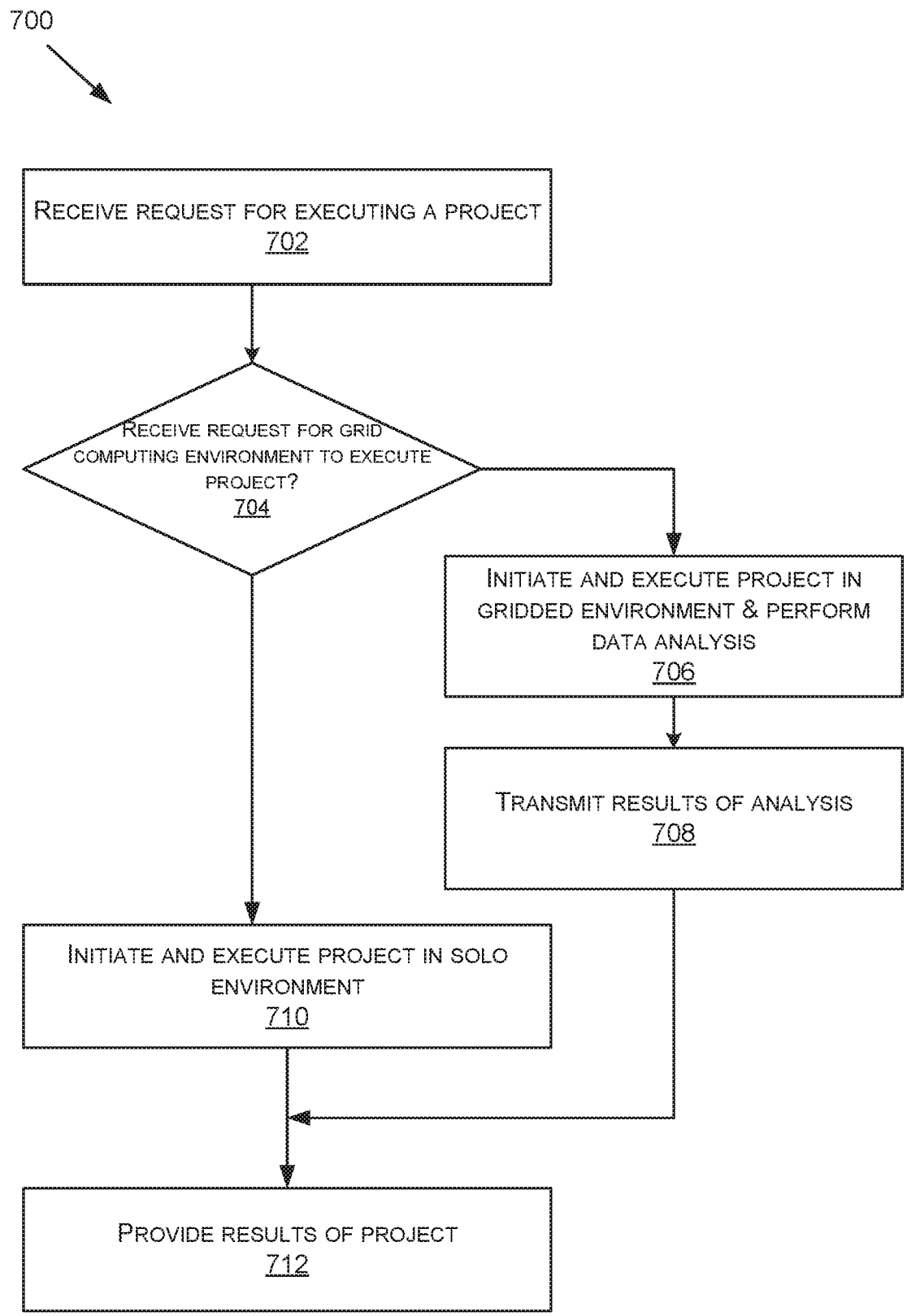
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is not published to the out-messaging network device. When the first status of the computing device is standby, the received event block object is stored in the non-transitory computer-readable medium.

Figure 11:
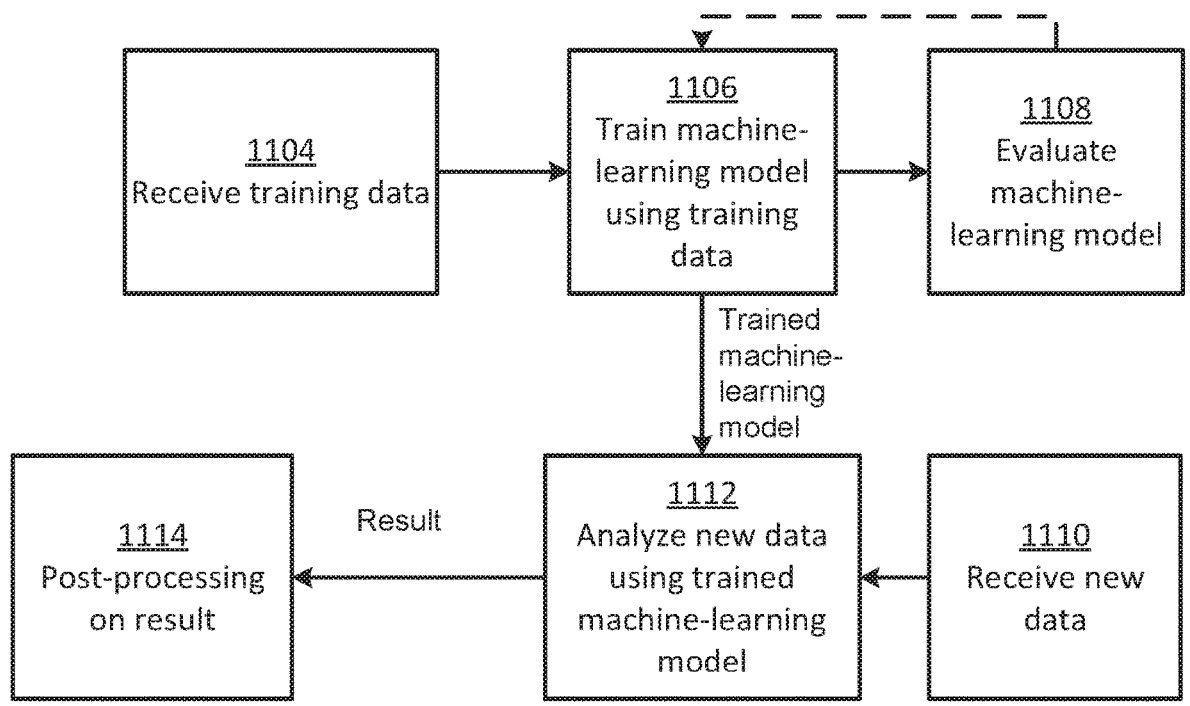
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
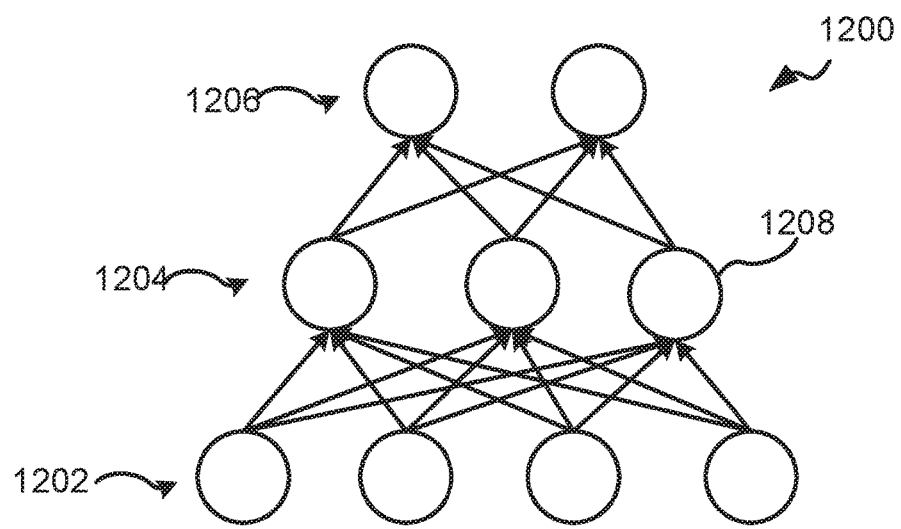
FIG. 12 illustrates an example of a machine-learning model as a neural network according to at least one embodiment of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Entity resolution is a computing technique used to identify references (such as data points or records) that reference common entities. For instance, if data records contain data indicating a common phone number, address, or name, they may all be candidates for referring to the same company, organization, group, item or individual. A commonly used approach to entity resolution provides multiple match criteria (e.g., determining that data records all describe an entity if they match on name and phone number and/or match on name and address). Additionally, or alternatively, entity resolution may use fuzzy matching and allow matching on single or multiple match criteria even when there are differences. These scenarios allow for indirect matching such that a reference A may match a reference C by virtue of them both matching reference B even though A and C may have little or nothing in common. In this scenario reference B may be considered a central data record that acts as an intermediary between peripheral records (references A and C).

While fuzzy matching and/or multiple match criteria can successfully bring together data records, one of its shortcomings is the risk that while allowing flexibility on the matching criteria the approach may not consider non-matching data. While fuzzy matching and/or multiple match criteria works well for direct matches between records (e.g., between reference A and B), it can struggle to cope with the example above where A and C indirectly match. It can be difficult for a computer to determine whether B should match with A or C as it seems to match with both. One or more embodiments herein are useful for improving entity resolution (e.g., in situations where records are linked together that do not describe the same entity).

Figure 13:
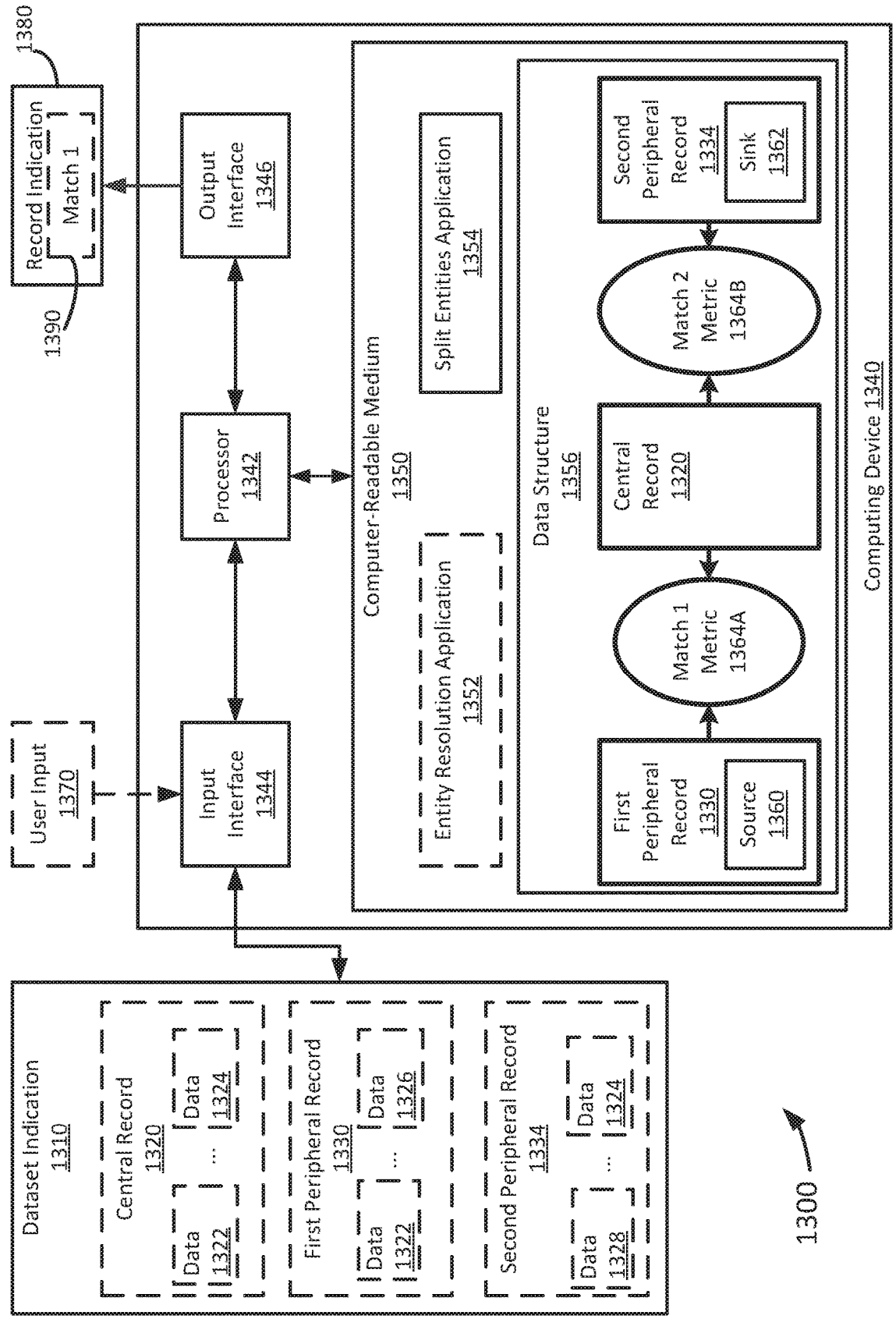
FIG. 13 illustrates a block diagram of a system for generating and outputting a record indication that at least one of a first peripheral record and a second peripheral record do not describe a central entity in at least one embodiment of the present technology.

FIG. 13 illustrates a block diagram of a system 1300 for generating and outputting an indication that at least one of a first peripheral record and a second peripheral record do not describe an entity.

The system 1300 includes a computing device 1340. The computing device 1340 is a system including an input interface 1344, an output interface 1346, a computer-readable medium 1350, and a processor 1342. In other embodiments, fewer, different, and additional components can be incorporated into computing device 1340.

In one or more embodiments, the input interface 1344 receives a dataset indication 1310 of a dataset with data records each resolved to describe a single entity in an entity resolution. For instance, the dataset indication 1310 may comprise the data records resolved to describe the single entity (e.g., central record 1320, first peripheral record 1330, and second peripheral record 1334). The dataset indication 1310 may comprise a location or identifier of the dataset or data records.

In FIG. 13, the data records comprise multiple records resolved to describe a single entity in an entity resolution based on matching data of a central record 1320 of the data records. Other techniques could be used to preliminary determine that records are candidates for describing a same entity (e.g., clustering algorithms). In this case, the central record 1320 comprises first data 1322 (e.g., a phone number) matching data of a first peripheral record 1330 of the multiple peripheral records. The central record 1320 comprises second data 1324 (e.g., an address) matching data of a second peripheral record 1334 of the multiple peripheral records. However, embodiments herein are applicable to other datasets (e.g., datasets with only two match records, datasets with multiple central records, and peripheral records that serve as central records with respect to other peripheral records). Typically, entity resolution is performed on data records with multiple data fields for potential matching criteria (e.g., 30-40 fields). For instance, a person entity in a complex system with multiple data sources can lead to 50 or more matching records. Further, the peripheral records typically have more data in common with the central record 1320 (e.g., they may each have a same name identifier, gender, address and/or education for the entity).

In one or more embodiments, it may be beneficial to split or separate entity records describing the same entity (e.g., data may have been entered incorrectly in a data record leading to an incorrect entity resolution). The output interface 1346 can be used to split entity records resolved to describe the same entity. For instance, the output interface 1346 outputs a record indication 1380 that at least one of the first peripheral record 1330 and the second peripheral record 1334 does not describe the single entity. The record indication 1380 may, for instance, indicate to unlink a match 1390, change a rule that brought the records together (e.g., a matching rule in the entity resolution), or indicate one or more entities different from the initial single record to match one or more records of the dataset.

In one or more embodiments, the input interface 1344 and output interface 1346 are one or more internal interfaces for receiving and outputting to the computing device (e.g., retrieving data stored at the computing device, storing output data at the computing device, or outputting for further processing at the computing device 1340). Alternatively, or additionally, the computing system 1300 comprises additional devices not shown (e.g., input devices or output devices). The system 1300 is configured to exchange information between the computing device 1302 and other system devices via the input interface 1344 and output interface 1346 (e.g., exchanging dataset indication 1310 or record indication 1380 via wired and/or wireless transmission). For example, a network (not shown) can connect one or more devices of system 1300 to one or more other devices of system 1300.

In an alternative embodiment, the same interface supports both input interface 1344 and output interface 1346. For example, a touch screen provides a mechanism for user input and for presentation of output to the user. Alternatively, the input interface 1344 has more than one input interface that uses the same or different interface technology. Alternatively, or additionally, the output interface 1346 has more than one output interface that uses the same or different interface technology.

Computer-readable medium 1350 is an electronic holding place or storage for information so the information can be accessed by processor 1342. Computer-readable medium 1350 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1342 executes instructions (e.g., stored at the computer readable medium 1350). The instructions can be carried out by a special purpose computer, logic circuits, or hardware circuits. In one or more embodiments, processor 1342 is implemented in hardware and/or firmware. Processor 1342 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1342 operably couples with input interface 1344, with output interface 1346 and with computer-readable medium 1350 to receive, to send, and to process information. Processor 1342 in one or more embodiments can retrieve a set of instructions from a permanent memory device and copy the instructions in an executable form to a temporary memory device that is generally some form of RAM.

In one or more embodiments, computer-readable medium 1350 stores instructions for execution by processor 1342. For example, computer-readable medium 1350 comprises instructions for a split entities application 1354 for determining that at least two entity records of the dataset resolved to describe an entity do not actually describe a same entity; and generating a record indication (e.g., to split the records of the dataset or identify one or more record to separate from an entity resolution). In one or more embodiments, the computer-readable medium 1350 optionally comprises instructions for an entity resolution application 1352 for performing the entity resolution to resolve the data records indicated by the dataset indication 1310.

In one or more embodiments, the split entities application 1354 generates a data structure 1356 identifying record linkage information for records of the dataset. The data structure 1356 may be stored in the computer-readable medium 1350. The record linkage information indicates linked records that have matching data (e.g., first peripheral record 1330 is linked to central record 1320 in the data structure 1356).

In the example shown in FIG. 13, there are indirect matches in the data structure 1356. For example, Table 1 shows example data values associated with data records in the data structure 1356. An entity resolution may determine that there is matching data (e.g., last name and date of birth) and determine that all of these data records describe an entity Mick Johnson.

TABLE 1

| Record | Name | Date of birth |
| --- | --- | --- |
| Central record | Mick Johnson | 17 Jul. 1978 |
| First peripheral record | Michael Johnson | 17 Jul. 1978 |
| Second peripheral record | Nick Johnson | 17 Jul. 1978 |

First peripheral record 1330 and central record 1320 are a good direct match (Mick being a shortened form of Michael). Second peripheral record 1334 and central record 1320 are very similar with only one character difference in the name. However, indirectly matching the first peripheral record 1330 and second peripheral record 1334 are not so clear because of the differences in the data between these records.

In one or more embodiments, the split entities application 1354 can execute a minimum cut algorithm to identify one or more connections of the pathway to unlink. For instance, OPTNET on Viya® provided by SAS, Institute, Inc. of Cary, N.C. can implement a minimum cut algorithm using the MINCUT <options> statement. The split entities application 1354 sets a first one of the data records as a source 1360 of a theoretical flow in the minimum cut algorithm and a second one of the data records as a sink 1362 receiving the theoretical flow in the minimum cut algorithm. In this example, the first peripheral record 1330 was set as the source 1360 and the second peripheral record 1334 was set as the sink 1362. The record linkage information indicates one or more pathways between the source and the sink along the linked records. Other records in the dataset could have been set as the source or sink (e.g., a central record).

The split entities application 1354 comprises instructions for identifying a first set of linked records that when unlinked would disconnect all of the one or more pathways between the source and the sink (e.g., first peripheral record 1330 and central record 1320) and identifying a second set of linked records that when unlinked would disconnect all of the one or more pathways between the source and the sink (e.g., central record 1320 and second peripheral record 1334). The first set of linked records is different than the second set of linked records. The split entities application 1354 comprises instructions for generating a respective metric for each of respective linked records of the first set of linked records and the second set of linked records (e.g., match 1 metric 1364A and match 2 metric 1364B). The split entities application 1354 comprises instructions for computing a first sum of one or more metrics corresponding to linked records of the first set and computing a second sum of one or more metrics corresponding to linked records of the second set. In this example, there was only one metric for each set, so the first sum was equal to match 1 metric 1364A and the second sum was equal to match 2 metric 13646. In other cases, there may be more than one match metric between records (e.g., a metric representing the match on phone number and a second metric representing the match on name). The metrics could be weighted to determine the relative value between these matches. For instance, using a distance measurement between names of records in Table 1 could show that Mick and Nick with only one character difference is closer than Mick and Michael with 4 characters difference, so match 2 metric 13546 would be ranked higher than match 1 metric 1354A.

The split entities application 1354 comprises instructions for identifying one or more connections of the pathway to unlink based on the first sum and the second sum (e.g., based on a comparison). For example, the computing device 1340 may identify to unlink match 1 metric 1364A if it has a lower value than match 2 metric 1364B.

In one or more embodiments, the split entities application 1364 generates the record indication 1380 indicating that at least one of the first peripheral record 1330 and the second peripheral record 1334 does not describe the single entity. For instance, the record indication 1380 may indicate to unlink a match between the central record 1320 and one or more of the first peripheral record 1330 and the second peripheral record 1334. In this case, the lowest value metric match 1 metric 1364A would suggest unlinking the match between first peripheral record 1330 and central record 1320.

Alternatively, or additionally the record indication 1380 may indicate multiple entities for matching or assigning the records in the data structure 1356 (e.g., determining that the records should describe two different entities rather than a single entity). In this case, the records may indicate a Mick Johnson and a Michael Johnson.

Alternatively, or additionally, the record indication 1380 may indicate to change a matching rule (e.g., a matching rule or criteria for matching in the entity resolution) such that the first peripheral record 1330 will match the central record 1320 according to the matching rule, but the second peripheral record 1334 will not match the central record 1320 according to the matching rule. For instance, if the first peripheral record 1330 and central record 1320 were matching based on similar phone number, and the central record 1320 and second peripheral record 1334 were matching based on a similar address, the results of the further analysis of the entity resolution may suggest a problem with matching on a similar phone number. Therefore, this criteria for matching could be removed for future entity resolutions or an incorrect telephone number value corrected.

In one or more embodiments, the computer-readable medium 1350 optionally comprises an entity resolution application 1352 with computer instructions for performing an entity resolution, for generating the dataset indication 1310, obtaining the dataset indication 1310 or obtaining data records. For instance, the data records in the data structure 1356 may be a partition of a larger dataset. The computing device 1340 may receive the dataset indication 1310 by partitioning the data records of the larger dataset into entities, and provisionally determining that the partition of the larger dataset describes the single entity in the entity resolution. Alternatively, or additionally aspects of the entity resolution application 1352 are performed by another device in the system 1300.

In one or more embodiments, the computing device 1340 optionally receives user input 1370 for providing input for execution of the split entities application 1354 or entity resolution application 1352 (e.g., for controlling or triggering these applications). For instance, the user input 1370 may provide thresholds or prioritizations. The user input 1370 may be received via input devices not shown (e.g., using a graphical user interface, a keyboard, a mouse, a trackpad, a microphone).

In other embodiments, fewer, different, or additional applications can be stored in computer-readable medium 1350 (e.g., entity resolution application 1352 and split entities application 1354 may be performed by a single application). In one or more embodiments, one or more applications stored on computer-readable medium 1350 are implemented in software (e.g., computer-readable and/or computer-executable instructions) stored in computer-readable medium 1350 and accessible by processor 1342 for execution of the instructions. The applications can be integrated with other data record tools (e.g., offered by SAS Institute Inc. of Cary, N.C., USA).

The example shown in FIG. 13 is a simple example of indirect linking. Other data records can have linking extending further than a few steps and there may indeed be multiple indirect matches between two non-matching entity references or peripheral records may be central records for other peripheral records.

Figure 14A:
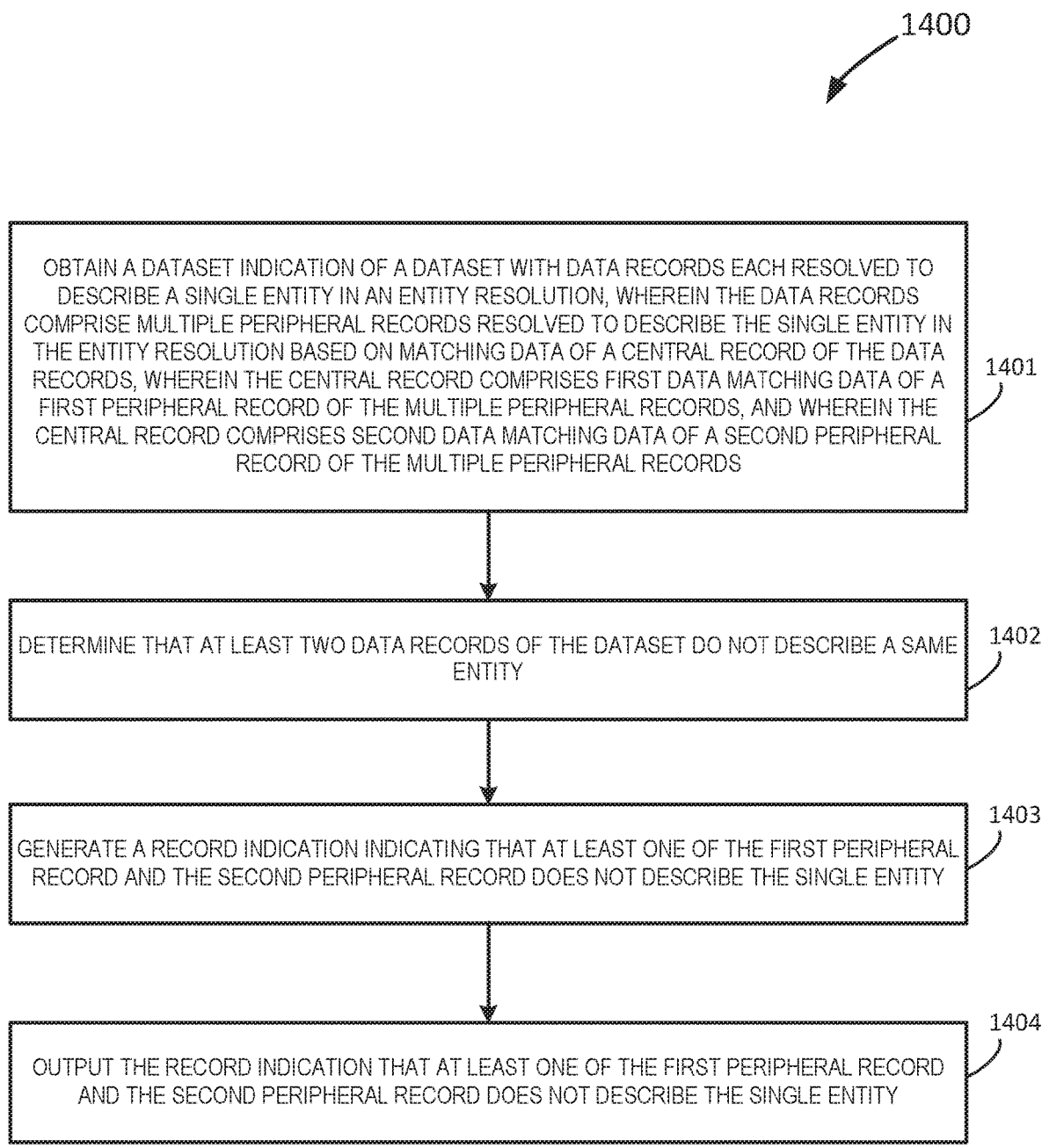
FIGS. 14A and 14B illustrate flow diagrams for generating an indication that at least two records of the data records do not describe a same entity.
Figure 14B:
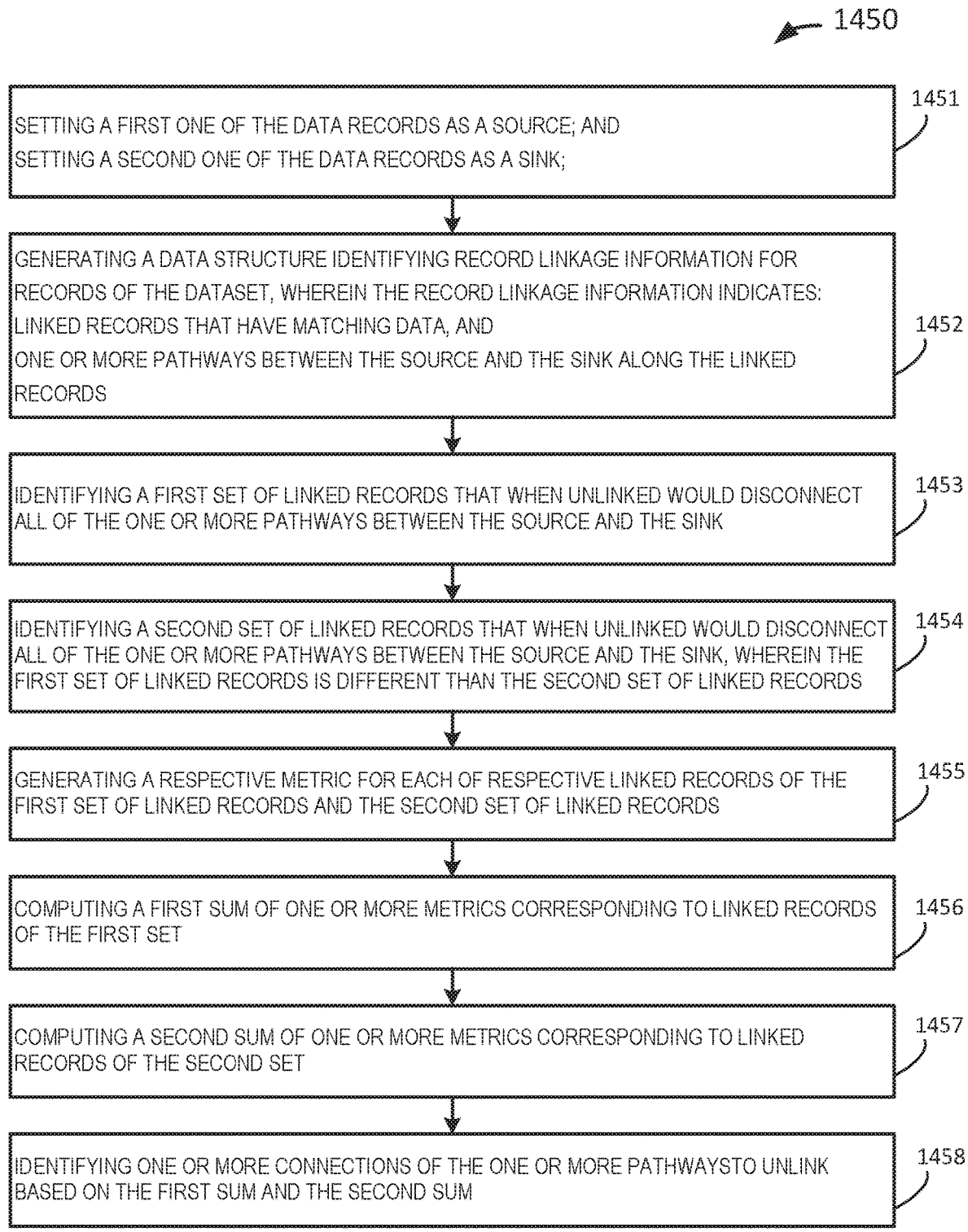

FIGS. 14A and 14B illustrate flow diagrams for generating an indication that at least two records of the data records do not describe a same entity no matter the complexity of the matching. Embodiments described herein, including the methods depicted in FIGS. 14A and 14B, may be implemented by a computing system (e.g., computing system 1300). The computing system may comprise multiple or a single device (e.g., computing device 1340).

FIG. 14A shows a method 1400 for outputting a record indication that at least one of a first peripheral record and a second peripheral record does not describe the single entity. The method 1400 comprises an operation 1401 for obtaining a dataset indication of a dataset with data records each resolved to describe a single entity in an entity resolution. The data records comprise multiple peripheral records resolved to describe the single entity in the entity resolution based on matching data of a central record of the data records. The central record comprises first data matching data of a first peripheral record of the multiple peripheral records. The central record comprises second data matching data of a second peripheral record of the multiple peripheral records. However, the dataset may comprise more data records.

For instance, FIG. 15A shows an example record information for data records 1510. The data records 1510 were resolved to describe a single entity: a person. The record information 1500 comprises data for one or more of data records 1510 corresponding to a name field 1512A, birthdate field 1512B, address field 1512C, phone field 1512D, and social security number (SSN) field 1512E. For this example, the entity resolution has defined match criteria. For simplicity the match criteria is set to require exact matches on combinations of data but could allow matches for similar data. The four different match criteria are: name and date of birth; name and address; name and telephone number; and social security number.

Figure 15B:
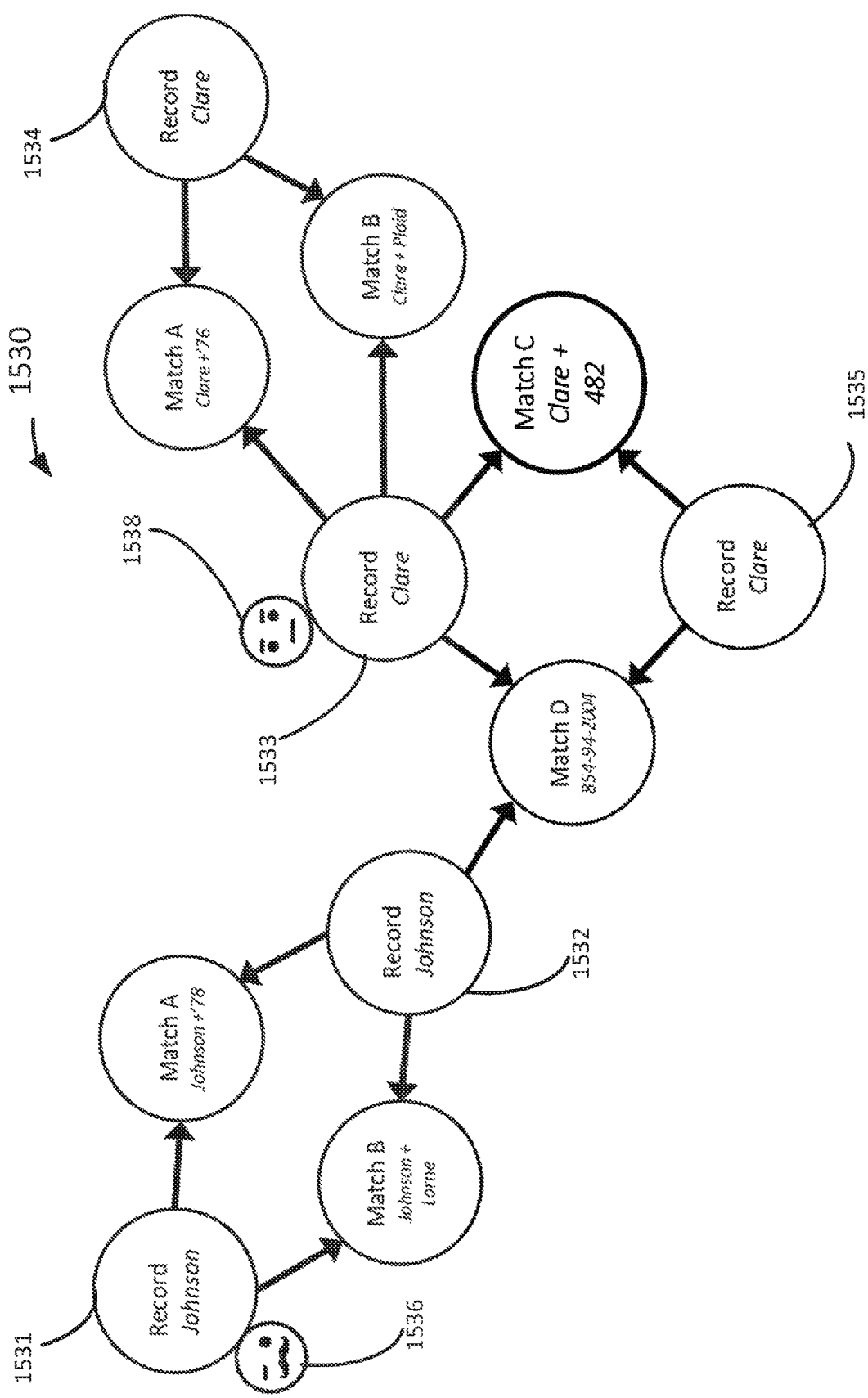
FIG. 15B illustrates an example graph according to at least one embodiment of the present technology.

FIG. 15B illustrates an example flow diagram 1530 modeling the matching of entity references with each entity reference being a vertex with an edge connecting it to match criteria (again, a vertex). In this case, arrows are used to represent a source record referencing a match criteria, but the matching could be represented undirected or bidirectional.

The method 1400 comprises an operation 1402 for determining that at least two data records of the dataset do not describe a same entity. For instance, the data records may be considered bad entities referring to resolved entities that may be incorrectly resolved (e.g., overmatched).

In one or more embodiments, a computing system can determine that at least two entity records of the dataset do not describe the same entity autonomously from intervention from human or other devices. For example, the computing system can determine that there are too many matches for the entity resolution to be reliable (e.g., a number of the linked records that have matching data exceeds a threshold) or determine that there is too much unmatching data in the data records (e.g., exceeding a threshold for a measure of difference between data of one or more of the linked records that have matching data, or a mismatch in prioritized or important data). In these cases, the computing system can be used to correct the entity resolution (e.g., the computing system can select based on a mismatch in prioritized data fields). Alternatively, or additionally, the computing system can issue an indication for user input (e.g., investigate the records to select a source and sink).

Additionally, or alternatively, a computing system may receive input from a user indicating information useful for determining that at least two entity records of a dataset do not describe a same entity. For instance, the input may indicate important or prioritized data trusted by the user (e.g., data identifiers or data fields of the dataset for trusted information) or other settings (e.g. threshold values). There may be a difference between data associated with a same data identifier or same data field for trusted information indicated as trusted by a user. A difference in trusted information may indicate the records do not describe the same entity. Additionally, or alternatively, a computing system may receive input from a user indicating a mismatch in data of the data records.

Determining a bad entity can be dependent on the data and its context in a real-world scenario. For example, a resolved entity may have a lot of references to it (possibly overmatched) but the context may be a retail bank account with data records comprising a set of retail banking financial transactions, and it is perfectly valid to have a large number of matches.

In the example shown in FIG. 15B, record 1531 and record 1533 are determined to not describe a same entity based on a difference in image data. A face 1536 has been added to record 1531 and face 1538 to record 1533 to indicate a mismatch in a photograph of an entity associated with the data records. The image data may be data information recognized as prioritized data with a mismatch in the prioritized data or a user with the image data could have provided input of a mismatch in these entities. Each of the matches to a central record 1532 in isolation seems valid. Record 1531 has matched with record 1532 by virtue of a matching name, date of birth and address, which seems strong. Record 1532 has matched record 1533 as they have the same social security number.

The method 1400 comprises an operation 1403 for generating a record indication (e.g., record indication 1380) indicating that at least one of the first peripheral record and the second peripheral record does not describe the single entity. For instance, embodiments herein can determine where in this graph edges must be excluded to ensure that a pair of non-matching entity references appear on distinct subgraphs which can then be treated as distinct entities.

Figure 15C:
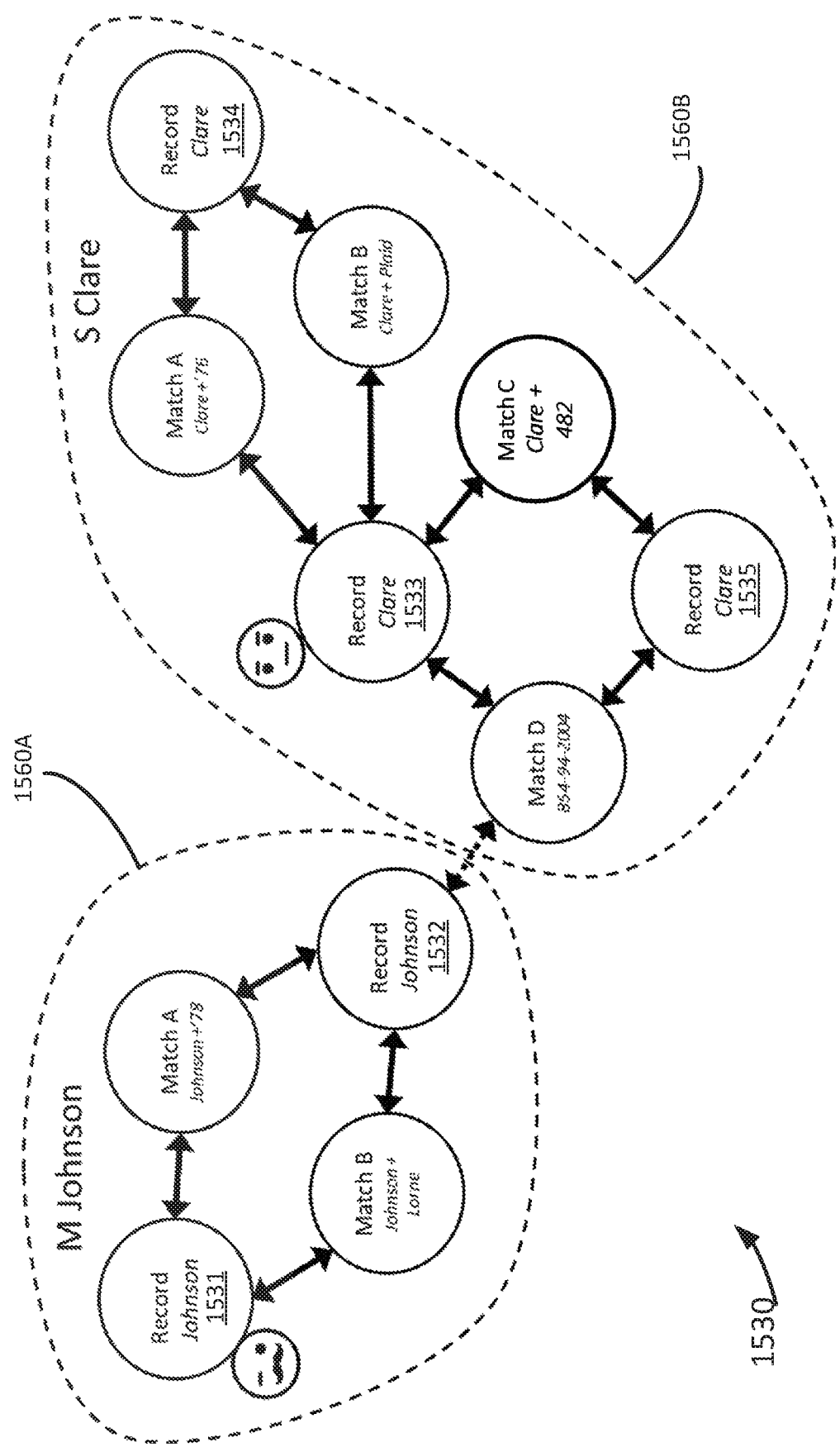
FIGS. 15C-15D illustrate an example of splitting an entity according to at least one embodiment of the present technology.

The method 1400 comprises an operation 1404 for outputting the record indication that at least one of the first peripheral record and the second peripheral record does not describe the single entity. FIG. 15C illustrates an example of splitting an entity, such that peripheral records are associated with different entities (M Johnson 1560A and S Clare 1560B). Intuitively it seems likely that records 1531 and 1532 represent one person and records 1533, 1534 and 1535 represent another person. In which case it is probably Match D (Social Security Number) that is incorrect. But which entity reference has an incorrect social security number? Well records 1533 and 1535 also match on name and telephone number so they probably are the same person. In which case the Social Security Number in record 1532 is most likely incorrect. As shown embodiments, herein can identify the most likely incorrect information (i.e., the match connection of record 1532).

FIG. 14B shows an example method 1450 for generating a record indication indicating that at least one of the first peripheral record and the second peripheral record does not describe the single entity. This method approach is a novel use of the solution to the max-flow min-cut problem. This algorithm is a technique as part of the Network Flow sub area of Graph Theory. The algorithm seeks to determine the maximum capacity of a flow network (modelled as weighted arcs) to transmit between pre-determined source and sink nodes. This maximum capacity is constricted by one or more bisection points of the network where the sum of the capacity of the edges of a single bisection is equal to the maximum capacity of the network. This bisection also corresponds to the set of edges which when cut would bisect the graph into two ensuring the source and sink are on distinct subgraphs at minimum cost (sum of edge weights).

This algorithm can be used in embodiments to determine one or more cuts that should be applied to split a resolved entity into two sub entities that best represent the two non-matching entities. One or more embodiments treat one entity reference as the source and another as the sink and apply the algorithm to determine the cut point. The graphs are recalculated using the connected components algorithm to determine the new sets of entity references that form the resulting entities. This approach in method 1450 has been tested on real data as a post processing step to standard entity resolution approaches and achieved excellent results, successfully identifying cuts point that correspond to intuitively incorrect values in the source data.

Figure 15D:
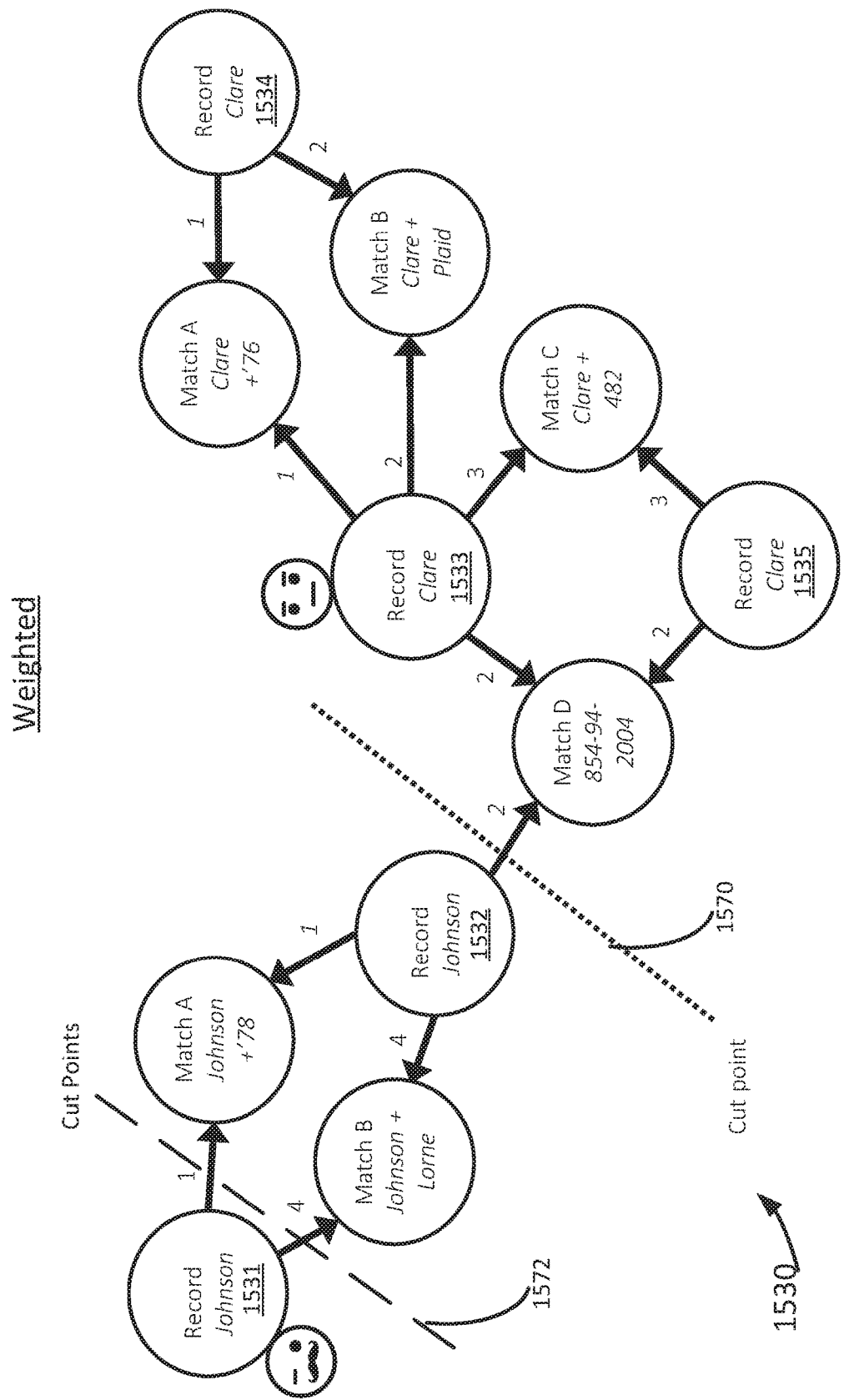

FIGS. 15C and 15D show an example of splitting an entity according to the method 1450 in FIG. 14B.

The method 1450 comprises an operation 1451 for setting a first one of the data records as a source and setting a second one of the data records as a sink. For instance, as shown in FIG. 15C and FIG. 15D the data records determined to be mismatched based on the image data could be selected as the source and sink (e.g., setting record 1531 as the source and setting record 1533 as the sink).

The method 1450 comprises an operation 1452 for generating a data structure identifying record linkage information for records of the dataset. The record linkage information indicates linked records that have matching data, and one or more pathways between the source and the sink along the linked records. FIGS. 15C and 15D graphically represent the record linkage information by showing matching connections between records in the flow diagram 1530.

The method 1450 comprises an operation 1453 for identifying a first set of linked records that when unlinked would disconnect all of the one or more pathways between the source and the sink. Cut points 1572 in FIG. 15D represents severing multiple pathways to disconnect source record 1531 from sink record 1533.

The method 1450 comprises an operation 1454 for identifying a second set of linked records that when unlinked would disconnect all of the one or more pathways between the source and the sink. The first set of linked records is different than the second set of linked records. Cut point 1570 in FIG. 15D represents severing a single pathway to disconnect source record 1531 from sink record 1533.

The method 1450 comprises an operation 1455 for generating a respective metric for each of respective linked records of the first set of linked records and the second set of linked records. For instance, generating the respective metric may comprise computing a weighting corresponding to an amount of similarity between the respective linked records of the linked records that have matching data. As shown the linked records associated with cut points 1572 have metrics 4 and 1 associated with each of the linked records based on similar data between the name field 1512A, the birthdate field 15128, and the address field 1512C. In this case, the metric also represents a relative importance of the similar information. Matches on the address field may be ranked higher, for instance, by a computing system than a birthdate because it is less likely unrelated entities would have a same address versus a birthdate.

Additionally, or alternatively, generating the respective metric may comprise computing a weighting corresponding to an amount of difference between linked records that have matching data. Cut point 1570 has a 2 metric associated because it has similar data with the SSN field 1512E and dissimilar information in the name field 1512A.

In this case, the data records had character strings and a computing system determined the similarities and differences by determining a distance measurement between character strings of the dataset; and allocating one or more respective weights to each of the respective linked records based on the distance measurement.

Alternatively, or additionally the data records could comprise other types of data such as image data. The computing system may generate a respective metric by determining a distance measurement between image data of the dataset and allocating one or more weights to each of the linked records based on the distance measurement.

The method 1450 comprises an operation 1456 for computing a first sum of one or more metrics corresponding to linked records of the first set. In this case, the sum would be 5 for cut points 1572.

The method 1450 comprises an operation 1457 for computing a second sum of one or more metrics corresponding to linked records of the second set. In this case, the sum would be 2 for cut point 1570 since there was only one metric.

The method 1450 comprises an operation 1458 for identifying one or more connections of pathway(s) to unlink based the first sum and the second sum (e.g., based on a comparison). In this case, cut point 1570 is selected to separate the bad entities associated with record 1531 and record 1533 because it had the lowest sum. Alternatively, the metrics could have been weighted differently such that the highest sum would be cut or the first computed cut point over a threshold is cut to save processing multiple cut points. Further, in this case the metrics in both flow directions were equivalent such that it did not matter which record was assigned as a source and sink, but it is possible for the algorithm to be executed on flow diagrams where the metrics are not the same such that the record selected as source or sink may influence the cut point selected.

Although some of the operational flows in methods described herein are presented in sequence, the various operations may be performed in various repetitions, concurrently (in parallel, for example, using threads and/or a distributed computing system) and/or in other orders than those that are illustrated. For example, operation 1451 is presented as a single operation but could be comprised in multiple operations (e.g., to set a sink before setting a source). Operation 1454 can be performed concurrently with or before operation 1453.

In solving bad entities there may not be a true answer given the information available or there may be more than one best answer. For example, the person or entity referred to in the data may not exist if it is a deliberate fabrication.

In many cases, there is not enough information, or the information may be incorrect, to determine with 100% accuracy what the real-world solution is. For instance, data may be incorrect if it has simply been mistyped upon data entry or deliberately mistyped for fraudulent reasons. Also, data may be incorrect if it is incorrectly associated upon entry with an existing entity in the system.

Embodiments herein come up with a good or best answer given the data provided by identifying the matches (or entity references that have matched) which are most likely to have been incorrectly brought together creating a bad entity match.

In the example shown in FIG. 15D, it was assumed the sum of weights of matches that have occurred between two entity references determine how strong the match is, and if the match is indirect, the minimum combined strength of matches that should be discarded to ensure that the Bad Entity is appropriately split is a best answer to solving the bad entity.

In the example shown in FIG. 15D, the flow diagram 1530 or match graph is modelled as a flow network by taking the two identified entity references which are making the entity bad (i.e. Record 1531 record 1533) and marking one as the source and the other as the sink and taking the weights of the matches and using them to determine the capacity of each edge that connect the match to an entity reference. A computer software algorithm called MaxFlowMinCut is used (e.g., a software tool such as OPTNET provided by SAS, Institute Inc., of Cary, N.C.). This algorithm identifies a set of edges, and in the case of network flow, sets the limit of the capacity of the flow network (MaxFlow) to correspond to the minimum sum of weights of edges that need to be cut to split the graph into the required subgraphs (MinCut).

In one or more embodiments, rules for entity splitting can be implemented in the algorithm. A computing system can implement rules to avoid splitting on strong matches. For instance, a match with a high weighting is less likely to be discarded than a match with a low weighting as the edge has a high capacity in the flow network and is less likely to determine the overall capacity of the flow network. Alternatively, or additionally, a computing system can implement rules to split on a strong match if the alternative is splitting a large number of weaker matches. For instance, a match with a high weighting may still be discarded if the total capacity of a set of matches with lower weighting is more than the capacity of the edge for the higher weighted match.

This is useful because even in the most reliable of entity references there is often the risk that the data may be incorrect. In the example shown in FIGS. 15A-15D, the Social Security Number data value 1520 has been mistyped for record 1533 which has created a strong match to the incorrect person. This has brought together entity references for two completely different people (S Clare and M Johnson) but as they are different people very little of their other data matches so there are very few other matches. While the match may carry a lot of weight, discarding it is preferable to discarding the set of matches where the name, date of birth, and home address match (i.e., severing at cut points 1572). The cut point 1570 is where only one entity reference (i.e., data value 1520) needs to be deleted and this can be done in an automated manner without need for human intervention to find and delete the erroneous entry. In this case, data was removed from a peripheral record to correct the entity resolution, but data incorrectly matching could have been removed from another central record or peripheral record. Alternatively, or additionally, data representing the connection could have been removed from the record linkage information.

The identification of mismatching records can be based on multiple values for a given type within the same entity (e.g. multiple unique ID's for a person resolved together) or as a distance measurement between characteristics of the entity (e.g. between character strings representing names or between images of the person).

As shown in FIGS. 15A-15D, the use of weights can further enhance where the cuts are made taking into account that some matches are so strong that they should not be discounted unless the next best solution is discounting a significant number of weaker matches.

Figure 16:
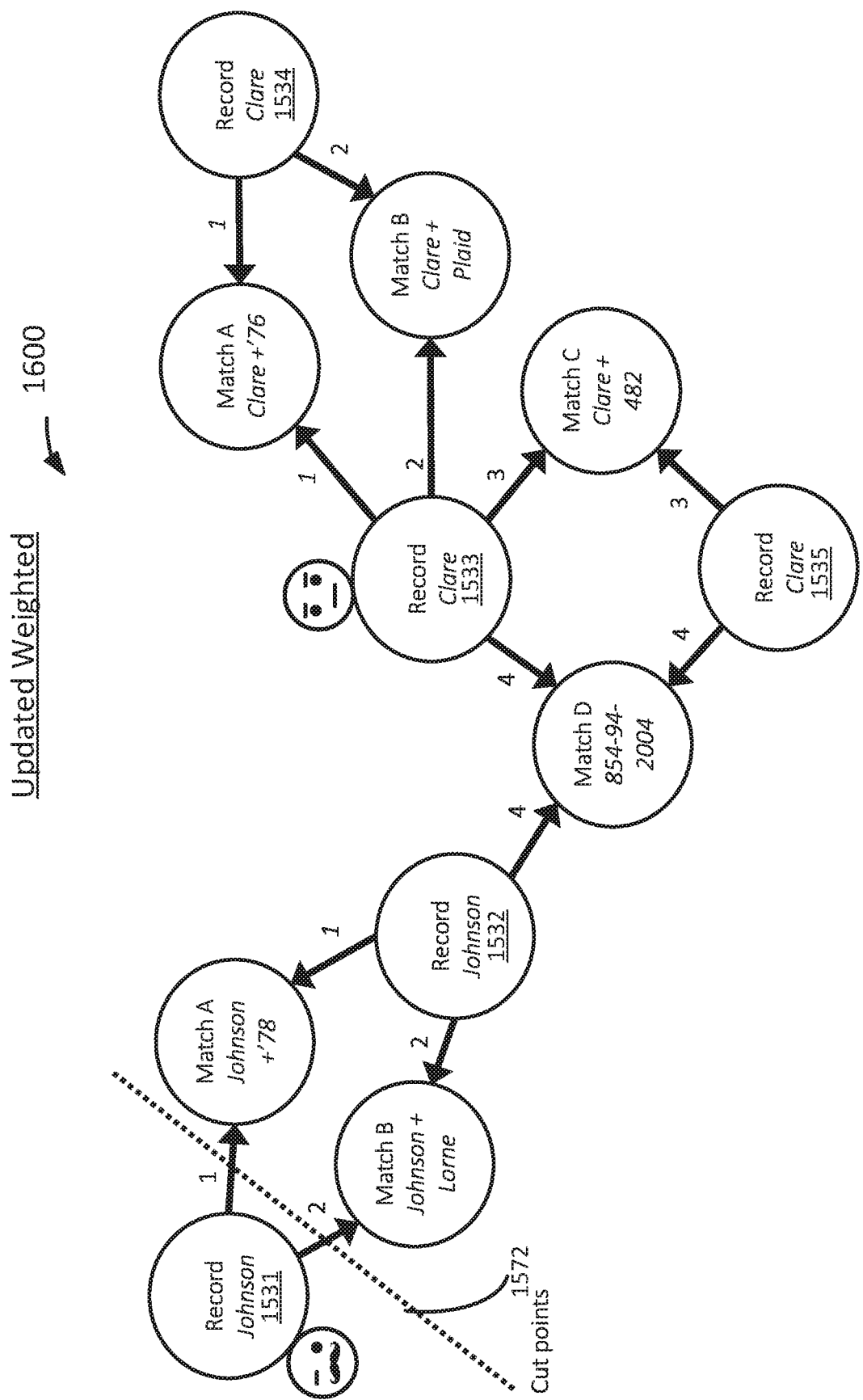
FIG. 16 illustrates an example of splitting an entity using a weighted graph according to at least one embodiment of the present technology.

In one or more embodiments, the weights can be augmented (e.g., in response to user input or indications of the quality of the data sources). FIG. 16 illustrates an example of splitting an entity using an updated weighted flow diagram 1600 with updated metrics for the records shown in FIG. 15A. The metric for matches based on a social security number match has been increased from 2 to 4 and the match based on address has been reduced from 4 to 2. Based on these updated metrics, the records would be separated at cut points 1572 now instead. In this case, the pathways between the record linkage information indicates multiple pathways between the source and the sink (e.g., pathways cut by cut points 1572). The computing device identifies multiple connections that must all be unlinked to disconnect the source from the sink. In this example, the social security match under the updated weighting was so strong that the solution is now to discount several weaker matches.

Embodiments herein are particularly helpful with correcting or adjusting entity resolution performed based on multiple match criteria, where there are indirect matches, and/or where there is missing or incorrect data. Data may be missing or incorrect when different systems are being combined that capture different data points or where the data input is not validated and may be mistyped or deliberately incorrectly provided or entered. The data in the data records may also periodically change or be updated.

FIG. 17A illustrates an example of updating record information. The record information 1700 is updated from the record information 1500 in FIG. 15A to include missing phone information 1710.

Figure 17B:
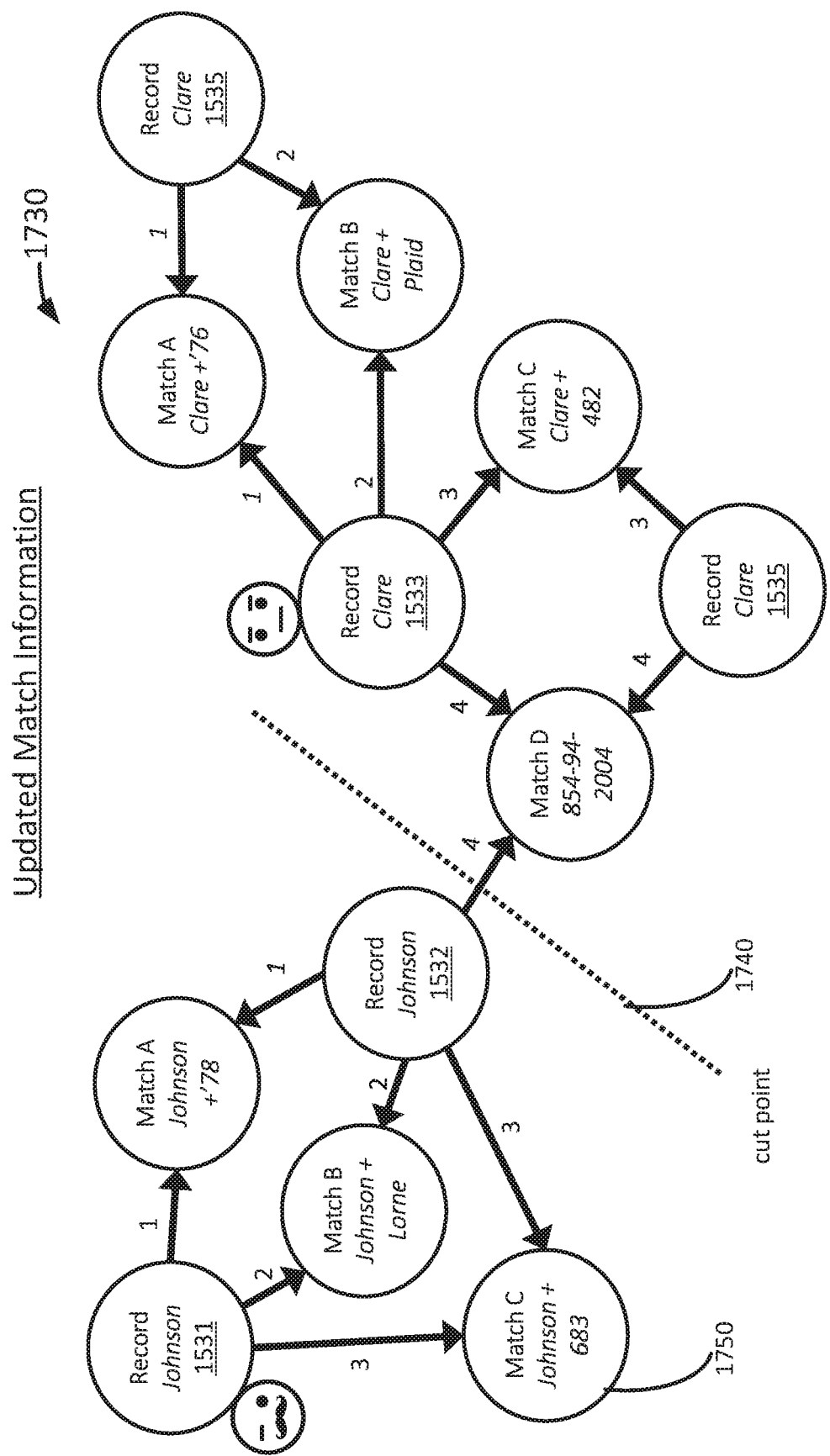
FIG. 17B illustrates an example of splitting an entity using an updated weighted graph according to at least one embodiment of the present technology.

FIG. 17B illustrates an example of splitting an entity using an updated weighted flow diagram 1730 updated from the updated weighted flow diagram 1600.

In this case, the match 1750 has been added responsive to the phone information 1710. This new match has changed the result such that the computing system will cut the strong match at cut point 1740 to prevent cutting so many links between record 1531 and record 1532.

In the examples shown, the record linkage information was represented in graphical form. However, the record linkage information may be represented in other forms. FIG. 17C illustrates an example data structure of record linkage information 1760 for the record information 1700. The record linkage information 1760 may comprise one or more of matching values information (e.g., match values column 1781), match type (e.g., match type column 1782), and match weight (e.g., match weight column 1783). The match type or matching values may have information used to derive the match weight. As shown in this example, a match type of A has a match weight corresponding to a value of 1 and match type B, has a match weight corresponding to a value of 2. Alternatively, or additionally, a computing system may use the matching values in match values column 1781 to calculate a similarity or dissimilarity that influences an allocated match weight.

In this form, the computing system may append to the dataset corresponding to record information 1700 additional data fields for the record linkage information 1760 or populate data fields of the dataset corresponding to record information 1700 with the record linkage information. The computing system can then identify connection(s) of the pathway to unlink based on determining a minimum sum of one or more metrics of the appended data fields or populated data fields.

In one or more embodiments, a computing system can generate a record indication indicating to unlink a match by removing data of the record linkage information (e.g., by removing the data in row 1770).

While embodiments herein may be implemented autonomously by the computing device, one or more embodiments, allow a user to provide input or control in adjusting an entity resolution. For instance, there are circumstances where a user is confident that a match is strong and should not be considered for discarding by the computing system. The user may have reviewed a set of records and determined that they are well matched (whether they were matched before or not). For example, the user may ensure all of the data that corresponds with a unique party within a customer database stays together, or the user is an investigator and has manually confirmed a specific set of matches.

A number of data transformations can be applied by the computing system to ensure that particular edges are not cut (e.g., setting the capacity or weight of the edge to infinity). This can be useful to implement user feedback or avoid the algorithm overriding valuable user feedback.

Figure 18A:
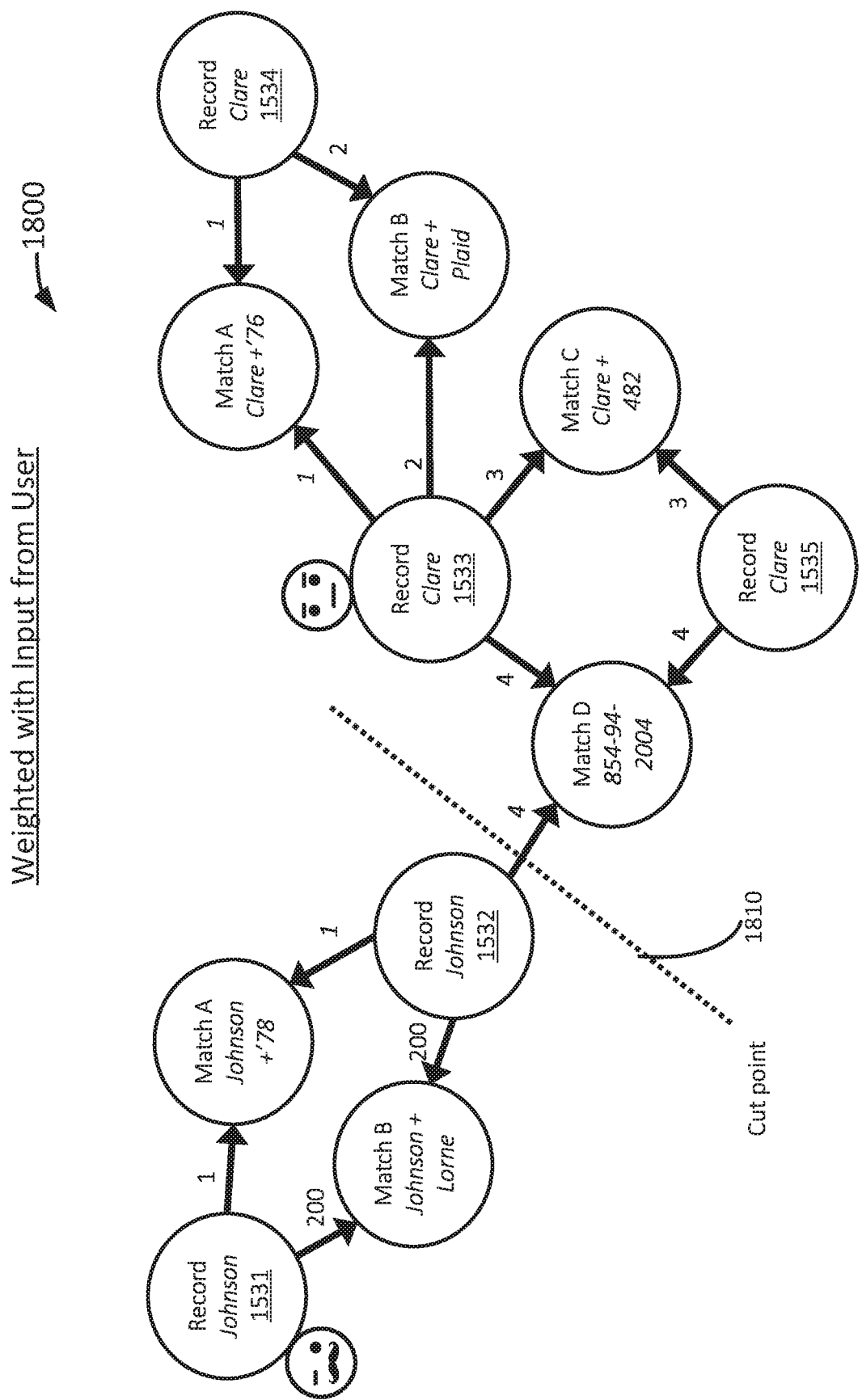
FIGS. 18A-18B illustrate examples of splitting an entity using a weighted graph based on input from a user according to at least one embodiment of the present technology.
Figure 18B:
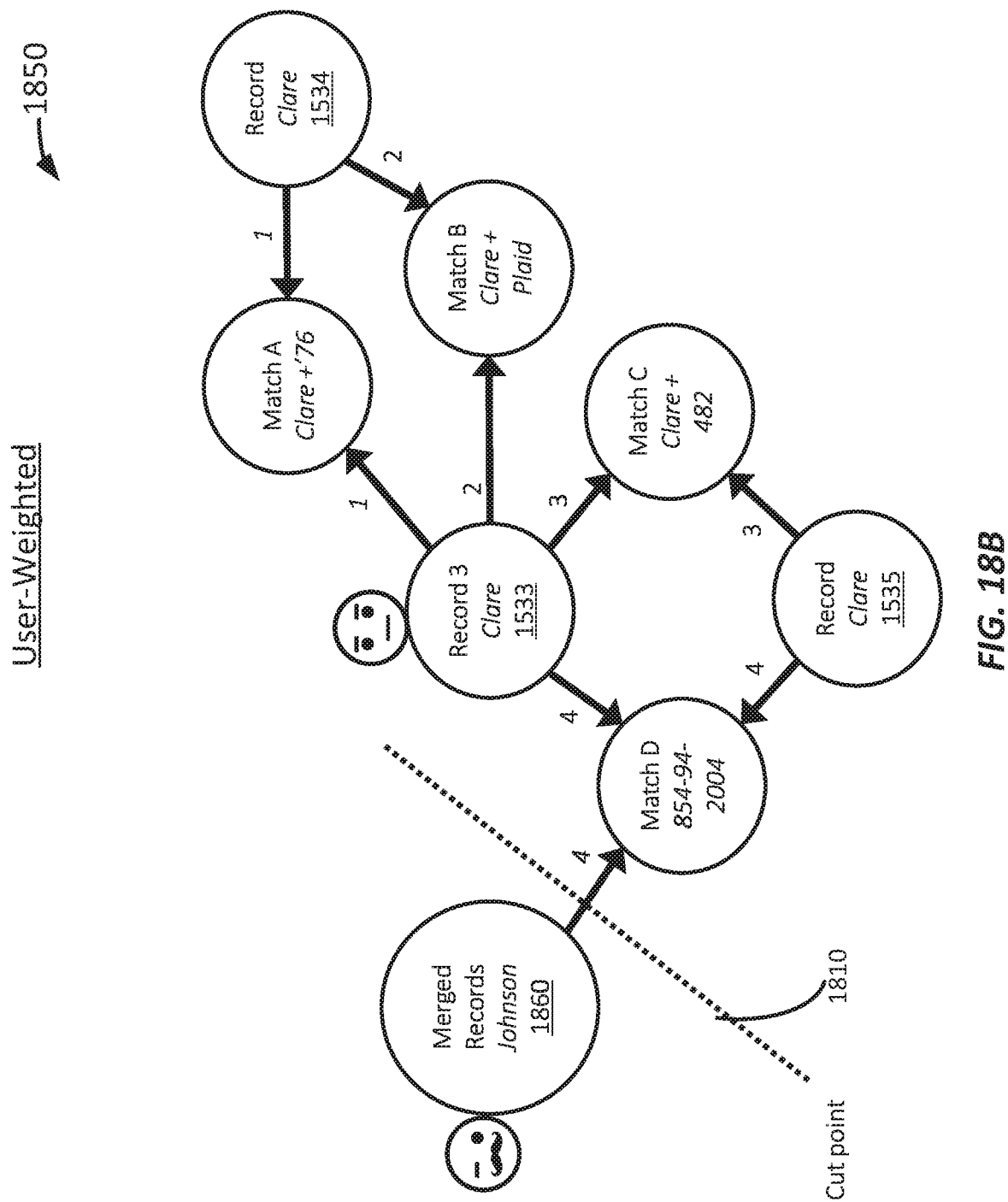

FIGS. 18A-18B illustrate examples of splitting an entity using a user-weighted flow diagram based on input from a user. The computing system has received input validating that two or more data records describe the same entity. This input could come from a user or a computing system. For example, a source system may have a record with an account number that a bank issued for a customer. The records may be merged with records from another system (e.g., provided by an insurance company) and the bank number may be incorrect. The source system or user may determine that these records should still be linked, and the mismatch ignored because the mismatch is unreliable.

In FIGS. 18A-18B, record 1531 and record 1532 have been validated. The data structure indicates a flow diagram 1800 of the one or more pathways between the source (record 1531) and the sink (record 1533) along the linked records of record information 1500 of FIG. 15A. In this example, the computing system prevents unlinking the validated data records by changing a value of a respective metric for linked records of the validated data records to a large number (e.g., 200). This ensures a cut point 1810.

Alternatively, the records could be merged together by the computing system and represented as a single node in the flow diagram. FIG. 18B shows a flow diagram 1850 with a merged node 1860 ensuring the cut point 1810.

Figure 19:
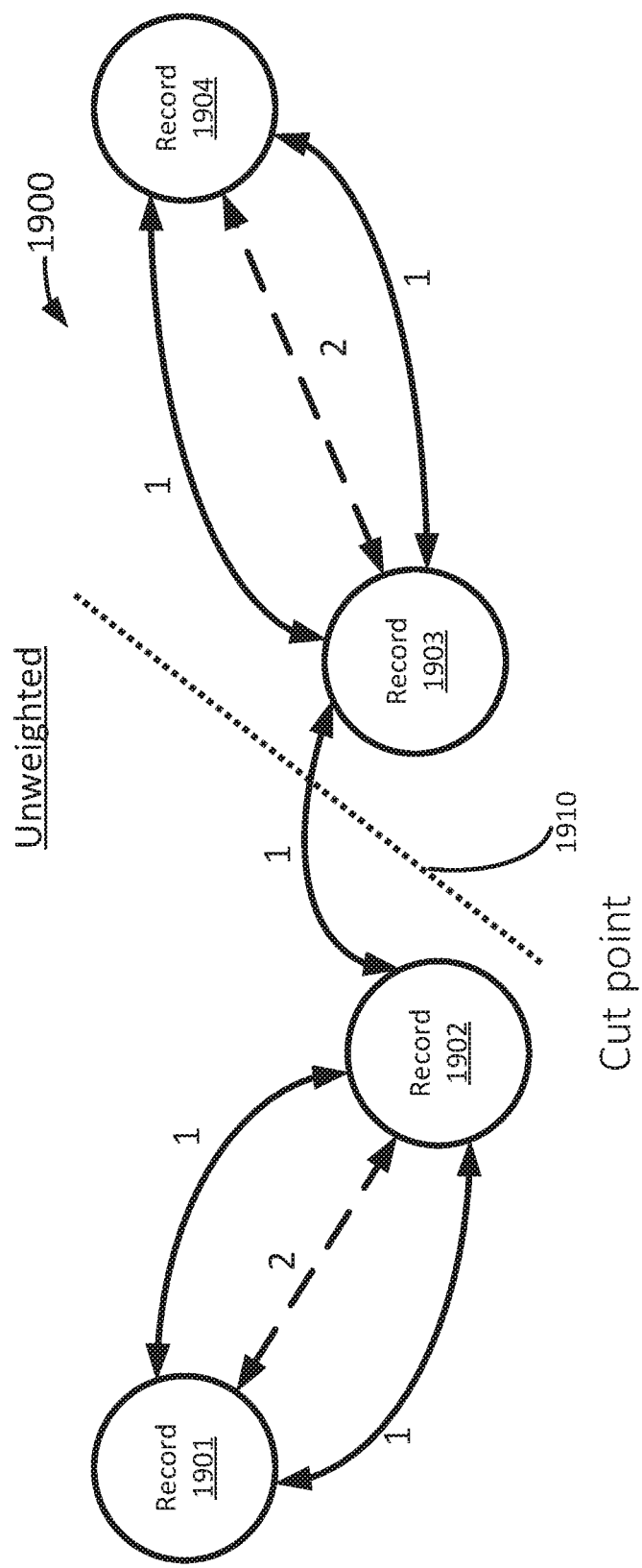
FIG. 19 illustrates an example of splitting an entity using an unweighted graph according to at least one embodiment of the present technology.

The construction of a flow graph can be modelled with weights applied based on the strength of the match, but it can alternatively be modeled more simply with equal weight given to all edges. FIG. 19 illustrates an example of splitting an entity using an unweighted flow diagram 1900. In this example, the record linkage information indicates individual connections between data of one or more data fields, or associated with one or more data indicators, of records of the dataset (represented here as solid arrows). A respective metric is generated for each of the respective linked records by generating an equivalent value for each individual connection of the individual connections. In this case, each connection was given a value of 1. In one or more embodiments, generating the respective metric for each of respective linked records comprises providing a combined weighting for at least two different types of data connections. In this case, dotted arrows are shown representing a combination of connections. The records 1901 and 1902 may be considered as having twice the weight or significance of records 1902 and 1903 as records 1901 and 1902 match on two criteria. A cut point 1910 is used to separate the records into two sets, a first set with record 1901 and 1902 and a second set with record 1903 and 1904.

Figure 20:
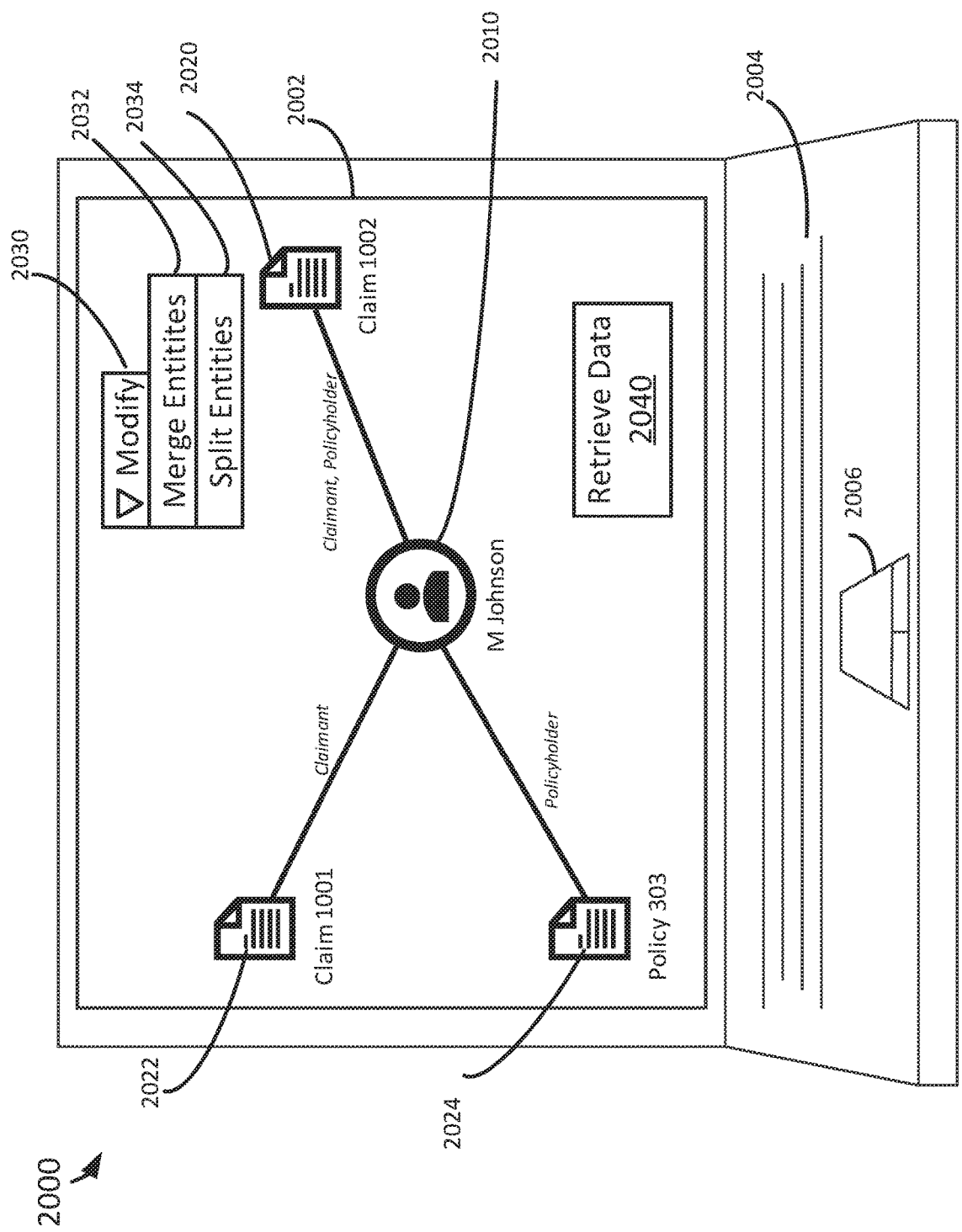
FIG. 20 illustrates an example of a graphical user interface for merging or splitting entities according to at least one embodiment of the present technology.

FIG. 20 illustrates an example of a graphical user interface 2002 for merging or splitting entities. In this example, the entity resolutions brought together records related to insurance claims for an insurance policy. The data records are represented graphically (i.e. claim icon 2022, claim icon 2020, and policy icon 2024) on the graphical user interface 2002 of a computing device 2000. The computing device 2002 has a keyboard 2004 and a track pad 2006 for receiving input from a user to control the graphical user interface 2002. The records could have been retrieved by receiving input from a user to navigate to a dataset for the records (e.g., using retrieve data control 2040). The records shown were drawn together using an entity resolution and are resolved to describe a single entity represented by the entity icon 2010.

The entity resolution may have been done automatically or in response to user input (e.g., selecting merge entities control 2032). Many types of entity resolution exist including types of clustering algorithms. One type of clustering algorithm is a cut-clustering algorithm, which uses a Max-FlowMinCut algorithm with an artificial sink with edges connected to each node in a population (e.g., a larger dataset). This is used to determine that records describe a single entity. The problem with one or more of these approaches to entity resolution is that the transitive nature of the matches may end up in a situation where each individual match makes good sense, but a resulting indirect match makes no sense. For example, in the previous example in FIG. 15D where the Social Security Number was mistyped.

Embodiments herein can correct an entity resolution as a post processing step to entity resolution. Embodiments herein can also use a MaxFlowMinCut algorithm, but it differs from traditional approaches to entity resolution. For instance, this algorithm could be used to cluster and create disjoint subgraphs simply as a way of creating a resolved entity. The present approach is instead targeted at a specific split (or a specific entity or cluster). It involves identifying entities that contain contradictory information that suggest they should not be clustered. Thus, the approach can be considered a specific solution to dealing with resolved entities that are identified as having incompatible records. Further, the approach as implemented need not use an artificial sink. The source and sink can be selected from records of the cluster.

In one or more embodiments, a computing system determines that at least two entity records of the dataset do not describe the same entity by displaying a graphical user interface (e.g., graphical user interface 2002) indicating data information of the linked records that have matching data; and receiving input from a user via the graphical user interface indicating that the first peripheral record and the second peripheral record do not describe the same entity (e.g., using a split entities control 2034).

Figure 21B:
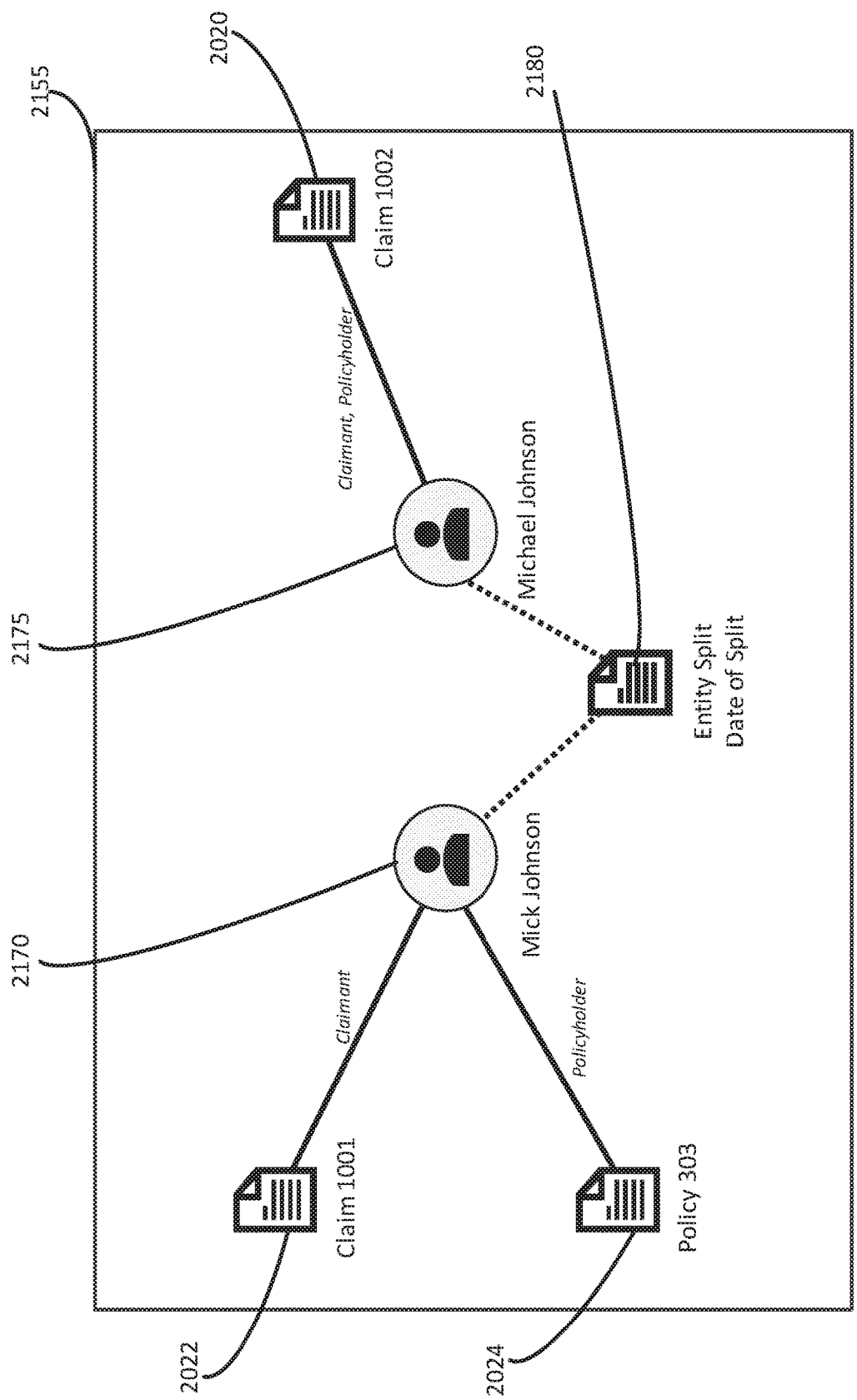

FIGS. 21A-21B illustrate an example of a graphical user interface 2100 for splitting entities overmatched after an entity resolution (e.g., in response to user input to split resolved entities).

FIG. 21A shows various information in data records associated with the claim and policy icons of FIG. 20. For instance, the graphical user interface 2100 shows a source system for the data record in source system column 2112. Embodiments herein can be used to join data records from different databases. The data records may identify location or identity information pertaining to documents associated with the data records (e.g., source doc/record column 2114). The data records may identify information regarding an entity associated with those documents (e.g., a name of the entity in name field 2118). In some cases, several entities may be associated with a document, and the data may identify a role of the entity in role column 2116. For instance, in this example the entity is sometimes a claimant and sometimes a policy holder.

In this example, the user has looked at identifiers expected to be unique for the entity (e.g., values in ID column 2120 or different Social Security Numbers). The computing system displaying the graphical user interface 2100 receives a record indication, in response to user input in Group A column 2110A and Group B column 2110B, indicating to associate one or more records with the first peripheral record (claim 1001/101101) and to associate one or more other records of the dataset with the second peripheral record (claim 1002/45602). Alternatively, the computing system could have selected, or preselected for user review, these records by comparing values brought together by an entity resolution (e.g., by doing a distance measurement between values of ID column 2120). Alternatively, or additionally, a computer or user could have reviewed photos or recorded telephone calls expected to be unique and associated with the records to determine a mismatch. In some cases, a computer can be used to initially analyze identifiers expected to be unique, and borderline cases are further reviewed by a human.

In one or more embodiments, the graphical user interface 2100 allows a user to enter a justification for splitting the entities using the drop down menu 2150 (e.g., a mismatch in ID in this case or mismatch in photo) or to provide other comments in the text box 2160. The graphical user interface 2100 also allows splitting of the entity into more than two groups (e.g. using the add entity control 2140).

In one or more embodiments, the graphical user interface 2100 allows a user to inspect the records further (e.g., using a drop-down menu 2130). The user may be able to select fields for augmenting match criteria or for augmenting a weight assigned to matches in a particular field.

In one or more embodiments, a computing system receives input from a user (e.g., via graphical user interface 2100) indicating a respective relative strength for different types of data in the dataset and allocates a respective weight to one or more connections of linked records based on similarities, differences, or both in a respective type of data according to the respective relative strength for that respective type of data. For instance, the user could select columns in the data records for augmenting the weight of matches with data pertaining to values in the column.

In one or more embodiments, the computing system outputs the record indication that at least one of the first peripheral record and the second peripheral record does not describe the central entity by displaying in the graphical user interface a division of the data information between the first peripheral record and the second peripheral record. As shown in FIG. 21B, the graphical user interface 2155 displays two entities (entity 2170 and entity 2175) to represent the records split between these entities. Entity icon 2170 is now associated with claim icon 2022 and policy icon 2024 and entity icon 2175 is now associated with claim icon 2020. In this case two new entity classifications were created a Mick Johnson and Michael Johnson, but in other cases a new entity is added to the single entity from the entity resolution or more than two entities are created.

In this case, both entities are displayed with a note icon 2180 used to keep track of split. In other cases, the graphical user interface could show only a single entity based on changing the matching rules across the full set of data, or cancelling specific matches between the two records, or a combination of the two.

Embodiments herein have been tested on real data as a post processing step to standard entity resolution approach as part of an intelligence management solution for a police force. In a policing environment, incorrect matches may mean an innocent person is suspected of a crime. Bad Entities were identified autonomously (based on having conflicting values for a specific identifier that is internal to the police systems but is considered 100% unique for a person) and/or with human intervention (where two records from the core policing system have been explicitly marked as not being a match). Results were found on manual inspection to successfully identify cut points that correspond to intuitively incorrect values in the source data.

Embodiments herein provide a way to separate out the constituent parts of a resolved entity ensuring that identified mismatching records are separated. This is a difficult problem to deal with when the entity resolution allows for indirect linking. This specific solution is most applicable when multiple match criteria are defined or fuzzy matching is used as the resulting resolved entity can be modelled as a network of linked records. Those of ordinary skill in the art will appreciate other useful applications (e.g., other approaches for entity resolution).

What is claimed is:

1. A computer-program product tangibly embodied in a non-transitory machine-readable storage medium, the computer-program product including instructions operable to cause a computing system to:
obtain a dataset indication of a dataset with data records each resolved to describe a single entity in an entity resolution, wherein the data records comprise multiple peripheral records resolved to describe the single entity in the entity resolution based on matching data of a central record of the data records, wherein the central record comprises first data matching data of a first peripheral record of the multiple peripheral records, and wherein the central record comprises second data matching data of a second peripheral record of the multiple peripheral records;
determine that at least two data records of the dataset do not describe a same entity;
based on determining that the at least two data records of the dataset do not describe the same entity, generate a record indication indicating that at least one of the first peripheral record and the second peripheral record does not describe the single entity by:
setting a first one of the data records as a source;
setting a second one of the data records as a sink;
generating a data structure identifying record linkage information for records of the dataset, wherein the record linkage information indicates:
linked records that have matching data, and
one or more pathways between the source and the sink along the linked records;
identifying a first set of linked records that when unlinked would disconnect all of the one or more pathways between the source and the sink;
identifying a second set of linked records that when unlinked would disconnect all of the one or more pathways between the source and the sink, wherein the first set of linked records is different than the second set of linked records;
generating a respective metric for each of respective linked records of the first set of linked records and the second set of linked records;
computing a first sum of one or more metrics corresponding to linked records of the first set;
computing a second sum of one or more metrics corresponding to linked records of the second set;
identifying one or more connections of the one or more pathways to unlink based on the first sum and the second sum; and
output the record indication that at least one of the first peripheral record and the second peripheral record does not describe the single entity.

2. The computer-program product of claim 1, wherein the instructions are operable to cause the computing system to determine that the at least two data records of the dataset do not describe the same entity autonomously based on:
a number of the linked records that have matching data exceeding a first threshold,
a measure of difference between data of one or more of the linked records that have matching data exceeding a second threshold, or
both the number of the linked records that have matching data exceeding the first threshold and the measure of difference between data of the one or more of the linked records that have matching data exceeding the second threshold.

3. The computer-program product of claim 1, wherein the instructions are operable to cause the computing system to:
determine that the at least two data records of the dataset do not describe the same entity by:
displaying a graphical user interface indicating data information of the linked records that have matching data; and
receiving input from a user via the graphical user interface indicating that the first peripheral record and the second peripheral record do not describe the same entity; and
output the record indication that at least one of the first peripheral record and the second peripheral record does not describe the single entity by displaying in the graphical user interface a division of the data information between the first peripheral record and the second peripheral record.

4. The computer-program product of claim 1, wherein the instructions are operable to cause the computing system to:
receive input from a user indicating data identifiers or data fields of the dataset for trusted information trusted by the user; and
determine the at least two data records do not describe the same entity based on a difference between data associated with a same data identifier or same data field for the trusted information.

5. The computer-program product of claim 1, wherein the record linkage information indicates individual connections between data of one or more data fields, or associated with one or more data indicators, of records of the dataset, and wherein generating the respective metric for each of the respective linked records comprises generating an equivalent value for each individual connection of the individual connections.

6. The computer-program product of claim 1, wherein generating the respective metric comprises computing a first weighting corresponding to an amount of difference, similarity, or both between the respective linked records of the linked records that have matching data.

7. The computer-program product of claim 6, wherein generating the respective metric comprises:
determining a distance measurement between character strings of the dataset; and
allocating one or more respective weights to each of the respective linked records based on the distance measurement.

8. The computer-program product of claim 6, wherein generating the respective metric comprises:
determining a distance measurement between image data of the dataset; and
allocating one or more respective weights to each of the respective linked records based on the distance measurement.

9. The computer-program product of claim 1, wherein generating the respective metric comprises:
receiving input from a user indicating a respective relative strength for different types of data in the dataset; and
allocating a respective weight to one or more connections of linked records based on similarities, differences, or both in a respective type of data according to the respective relative strength for that respective type of data.

10. The computer-program product of claim 1, wherein generating the respective metric for each of respective linked records comprises providing a combined weighting for at least two different types of data connections.

11. The computer-program product of claim 1, wherein the record indication indicates to change a matching rule such that the first peripheral record will match the single entity according to the matching rule, but the second peripheral record will not match the single entity according to the matching rule.

12. The computer-program product of claim 1, wherein the record indication indicates to unlink a match between the central record and one or more of the first peripheral record and the second peripheral record by removing:
matching data in the central record, first peripheral record, or second peripheral record;
data of the record linkage information; or
both the matching data and the data of the record linkage information.

13. The computer-program product of claim 1, wherein the record indication indicates to associate one or more records of the dataset with the first peripheral record and to associate one or more other records of the dataset with the second peripheral record.

14. The computer-program product of claim 1, wherein the instructions are operable to cause the computing system to:
receive input from a user validating two or more validated data records of the data records describe the same entity, wherein the data structure indicates a flow diagram of the one or more pathways between the source and the sink along the linked records; and
prevent unlinking the two or more validated data records by:
merging together as a single node in the flow diagram the two or more validated data records, or
changing a value of a respective metric for linked records of the validated data records.

15. The computer-program product of claim 1, wherein the instructions are operable to cause the computing system to:
append, to the dataset, additional data fields for the record linkage information, or populate data fields of the dataset with the record linkage information; and
wherein the identifying the one or more connections of the pathway to unlink comprises identifying the one or more connections based on determining a minimum sum of one or more metrics of the appended data fields or populated data fields.

16. The computer-program product of claim 1,
wherein the dataset is a partition of a larger dataset; and
wherein the instructions are operable to cause the computing system to obtain the dataset indication by:
partitioning the data records of the larger dataset into entities, and
provisionally determining that the partition of the larger dataset describes the single entity in the entity resolution.

17. The computer-program product of claim 1,
wherein the record linkage information indicates multiple pathways between the source and the sink; and
wherein the identifying one or more connections of the pathway to unlink comprises identifying multiple connections that must all be unlinked to disconnect the source from the sink.

18. A computer-implemented method comprising:
obtaining a dataset indication of a dataset with data records each resolved to describe a single entity in an entity resolution, wherein the data records comprise multiple peripheral records resolved to describe the single entity in the entity resolution based on matching data of a central record of the data records, wherein the central record comprises first data matching data of a first peripheral record of the multiple peripheral records, and wherein the central record comprises second data matching data of a second peripheral record of the multiple peripheral records;
determining that at least two data records of the dataset do not describe a same entity;
based on the determining that the at least two data records of the dataset do not describe the same entity, generating a record indication indicating that at least one of the first peripheral record and the second peripheral record does not describe the single entity by:
setting a first one of the data records as a source;
setting a second one of the data records as a sink;
generating a data structure identifying record linkage information for records of the dataset, wherein the record linkage information indicates:
linked records that have matching data, and
one or more pathways between the source and the sink along the linked records;
identifying a first set of linked records that when unlinked would disconnect all of the one or more pathways between the source and the sink;
identifying a second set of linked records that when unlinked would disconnect all of the one or more pathways between the source and the sink, wherein the first set of linked records is different than the second set of linked records;
generating a respective metric for each of respective linked records of the first set of linked records and the second set of linked records;
computing a first sum of one or more metrics corresponding to linked records of the first set;
computing a second sum of one or more metrics corresponding to linked records of the second set;
identifying one or more connections of the one or more pathways to unlink based on the first sum and the second sum; and
outputting the record indication that at least one of the first peripheral record and the second peripheral record does not describe the single entity.

19. The computer-implemented method of claim 18, wherein the determining that the at least two data records of the dataset do not describe the same entity comprises determining autonomously based on:
a number of the linked records that have matching data exceeding a first threshold,
a measure of difference between data of one or more of the linked records that have matching data exceeding a second threshold, or
both the number of the linked records that have matching data exceeding the first threshold and the measure of difference between data of the one or more of the linked records that have matching data exceeding the second threshold.

20. The computer-implemented method of claim 18, wherein the determining that the at least two data records of the dataset do not describe the same entity comprises:
displaying a graphical user interface indicating data information of the linked records that have matching data; and
receiving input from a user via the graphical user interface indicating that the first peripheral record and the second peripheral record do not describe the same entity; and
wherein the outputting the record indication comprises displaying in the graphical user interface a division of the data information between the first peripheral record and the second peripheral record.

21. The computer-implemented method of claim 18, wherein the computer-implemented method comprises:
receiving input from a user indicating data identifiers or data fields of the dataset for trusted information trusted by the user; and
wherein the determining the at least two entity records do not describe the same comprises determining based on a difference between data associated with a same data identifier or same data field for the trusted information.

22. The computer-implemented method of claim 18, wherein the record linkage information indicates individual connections between data of one or more data fields, or associated with one or more data indicators, of records of the dataset; and
wherein generating the respective metric for each of the respective linked records comprises generating an equivalent value for each individual connection of the individual connections.

23. The computer-implemented method of claim 18, wherein generating the respective metric comprises computing a first weighting corresponding to an amount of difference, similarity, or both between the respective linked records of the linked records that have matching data.

24. The computer-implemented method of claim 18, wherein generating the respective metric comprises:
receiving input from a user indicating a respective relative strength for different types of data in the dataset; and
allocating a respective weight to one or more connections of linked records based on similarities, differences, or both in a respective type of data according to the respective relative strength for that respective type of data.

25. The computer-implemented method of claim 18, wherein the record indication indicates to change a matching rule such that the first peripheral record will match the single entity according to the matching rule, but the second peripheral record will not match the single entity according to the matching rule.

26. The computer-implemented method of claim 18, wherein the record indication indicates to unlink a match between the central record and one or more of the first peripheral record and the second peripheral record by removing:
matching data in the central record, first peripheral record, or second peripheral record;
data of the record linkage information; or
both the matching data and the data of the record linkage information.

27. The computer-implemented method of claim 18, wherein the record indication indicates to associate one or more records of the dataset with the first peripheral record and to associate one or more other records of the dataset with the second peripheral record.

28. The computer-implemented method of claim 18, wherein the computer-implemented method comprises:
receiving input from a user validating two or more validated data records of the data records describe the same entity, wherein the data structure indicates a flow diagram of the one or more pathways between the source and the sink along the linked records; and
preventing unlinking the two or more validated data records by:
merging together as a single node in the flow diagram the two or more validated data records, or
changing a value of a respective metric for linked records of the validated data records.

29. The computer-implemented method of claim 18, wherein the computer-implemented method comprises:
appending, to the dataset, additional data fields for the record linkage information, or populating data fields of the dataset with the record linkage information; and
wherein the identifying the one or more connections of the pathway to unlink comprises identifying the one or more connections based on determining a minimum sum of one or more metrics of the appended data fields or populated data fields.

30. A computing device comprising processor and memory, the memory containing instructions executable by the processor wherein the computing device is configured to:
obtain a dataset indication of a dataset with data records each resolved to describe a single entity in an entity resolution, wherein the data records comprise multiple peripheral records resolved to describe the single entity in the entity resolution based on matching data of a central record of the data records, wherein the central record comprises first data matching data of a first peripheral record of the multiple peripheral records, and wherein the central record comprises second data matching data of a second peripheral record of the multiple peripheral records;
determine that at least two data records of the dataset do not describe a same entity;
based on determining that the at least two data records of the dataset do not describe the same entity, generate a record indication indicating that at least one of the first peripheral record and the second peripheral record does not describe the single entity by:
setting a first one of the data records as a source;
setting a second one of the data records as a sink;
generating a data structure identifying record linkage information for records of the dataset, wherein the record linkage information indicates:
linked records that have matching data, and
one or more pathways between the source and the sink along the linked records;
identifying a first set of linked records that when unlinked would disconnect all of the one or more pathways between the source and the sink;
identifying a second set of linked records that when unlinked would disconnect all of the one or more pathways between the source and the sink, wherein the first set of linked records is different than the second set of linked records;
generating a respective metric for each of respective linked records of the first set of linked records and the second set of linked records;

computing a first sum of one or more metrics corresponding to linked records of the first set;
computing a second sum of one or more metrics corresponding to linked records of the second set;
identifying one or more connections of the one or more pathways to unlink based on the first sum and the second sum; and
output the record indication that at least one of the first peripheral record and the second peripheral record does not describe the single entity.

* * * * *